(12) United States Patent
Matsumoto

(10) Patent No.: US 7,330,282 B2
(45) Date of Patent: Feb. 12, 2008

(54) DOCUMENT DELIVERY SYSTEM, DOCUMENT DELIVERY APPARATUS, DOCUMENT DELIVERY METHOD, PROGRAM FOR EXECUTING THE METHOD AND STORAGE MEDIUM STORING THE PROGRAM

(75) Inventor: Naoyuki Matsumoto, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1162 days.

(21) Appl. No.: 10/023,150

(22) Filed: Dec. 17, 2001

(65) Prior Publication Data

US 2002/0099707 A1 Jul. 25, 2002

(30) Foreign Application Priority Data

Dec. 19, 2000 (JP) ............................. 2000-385863

(51) Int. Cl.
*G06F 3/12* (2006.01)
*H04N 1/00* (2006.01)

(52) U.S. Cl. .................... 358/1.15; 358/1.13; 358/400; 358/402

(58) Field of Classification Search .................. 707/10, 707/205, 104.1; 709/217, 203, 214, 216; 358/1.15, 440, 1.16, 400, 402, 1.13, 1.1, 358/1.4, 1.6, 1.9, 1.2, 1.18, 403, 407, 408, 358/468, 404, 444; 370/578, 351, 432
See application file for complete search history.

(56) References Cited

U.S. PATENT DOCUMENTS

| | | | | |
|---|---|---|---|---|
| 5,999,601 | A * | 12/1999 | Wells et al. | 379/100.14 |
| 6,397,261 | B1 * | 5/2002 | Eldridge et al. | 713/171 |
| 6,615,234 | B1 * | 9/2003 | Adamske et al. | 709/203 |
| 6,687,877 | B1 * | 2/2004 | Sastry et al. | 715/512 |
| 6,785,023 | B1 * | 8/2004 | Iida | 358/442 |
| 2001/0043594 | A1 * | 11/2001 | Ogawa et al. | 370/356 |

* cited by examiner

*Primary Examiner*—Dov Popovici
(74) *Attorney, Agent, or Firm*—Rossi, Kimms & McDowell LLP

(57) ABSTRACT

A document delivery apparatus is provided, which is capable of performing automatic delivery processing of document information (e.g. received fax documents and scan documents) that has been created by devices, such as registering the documents in folders of a predetermined document management server, attaching the documents to predetermined email addresses, and outputting the documents to predetermined devices. The document delivery apparatus is connected via a network to a plurality of external devices and a plurality of servers. A delivery server makes delivery settings for document information received from the external devices, receives document information from the external devices, determines a delivery destination for the received document information, based on the delivery settings, and delivers the received document information to the determined delivery destination.

32 Claims, 29 Drawing Sheets

FIG. 14

| COMMAND | OBJECT TYPE | | | | |
|---|---|---|---|---|---|
| | SYSTEM MANAGEMENT | JOB | DOCUMENT | RESOURCES | LOG |
| Create Object | | ○ | ○ | ○ | ○ |
| Open Object | ○ | ○ | ○ | ○ | ○ |
| Close Object | ○ | ○ | ○ | ○ | ○ |
| Delete Object | | ○ | ○ | ○ | ○ |
| Read/Write Attribute | ○ | ○ | ○ | ○ | ○ |
| Read/Write Data | | | ○ | ○ | ○ |
| Search Object | | ○ | ○ | ○ | ○ |
| Search Attribute | | ○ | ○ | ○ | ○ |

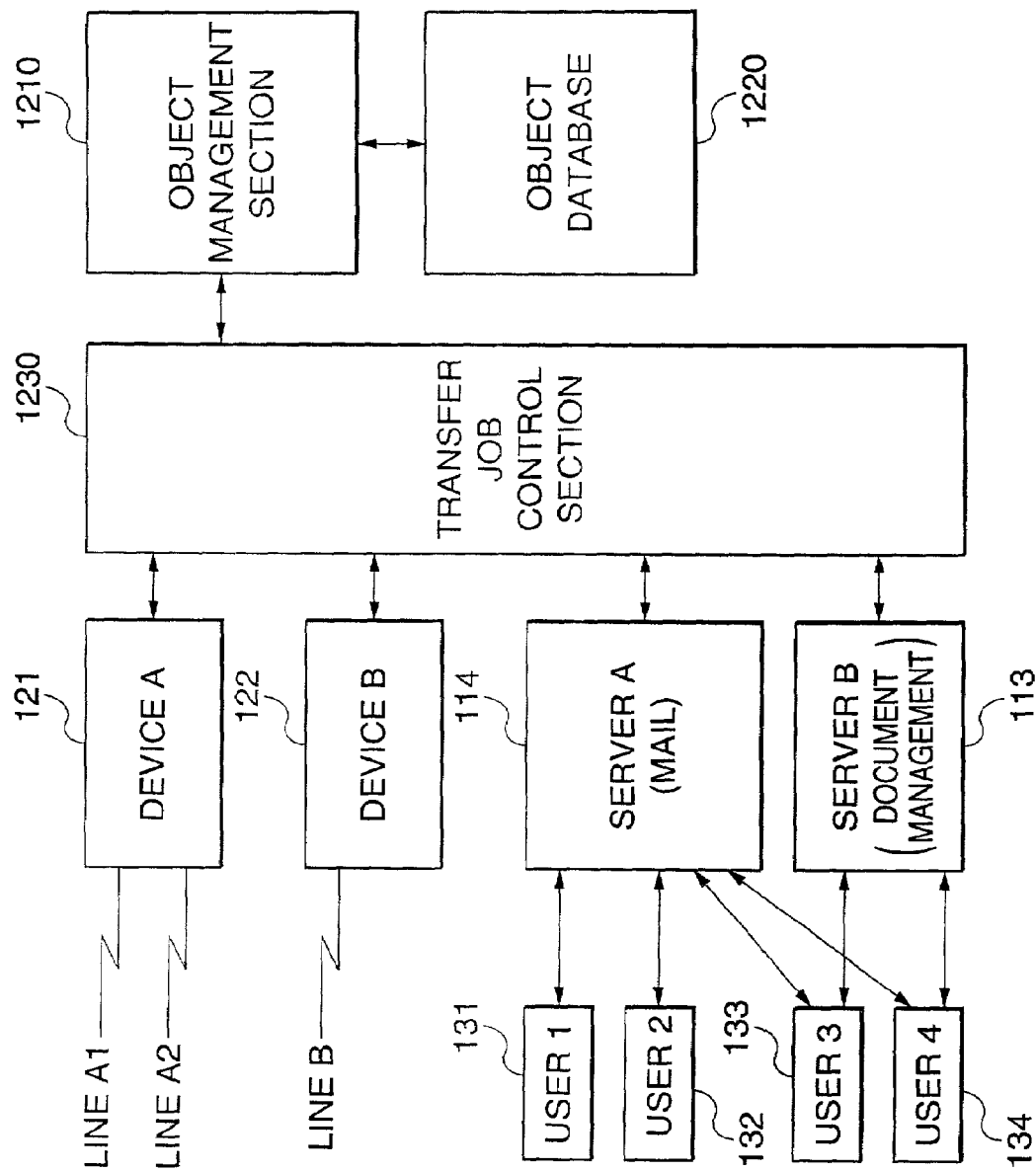

FIG. 21

| OBJECT | OBJECT ID | ATTRIBUTES ||||
| | | DELIVERY SETTINGS | DELIVERY ID | SERVER USED | DELIVERY DESTINATION SETTINGS |
|---|---|---|---|---|---|
| USER 1 | 01001 | PRESENT | 001 | SERVER A | User1@serverA.x.y |
| USER 2 | 01002 | PRESENT | 002 | NONE | DEVICE B (PRINTER) |
| USER 3 | 01003 | PRESENT | 003 | SERVER B | ✶user✶user3 |
| USER 4 | 01004 | PRESENT | 004 | NONE | DEVICE B (PRINTER) |
| DEVICE A | 02001 | PRESENT | NONE | SERVER B | ✶pub✶pub |
| DEVICE B | 02002 | PRESENT | NONE | SERVER A | Public@serverA.x.y |
| LINE A1 | 02003 | NONE | NONE | SERVER B | ✶pub✶pub |
| LINE A2 | 02004 | PRESENT | NONE | SERVER B | ✶pub✶pub2 |
| LINE B | 02005 | NONE | NONE | NONE | NONE |
| ... | | | | | |

FIG. 22A

| ATTRIBUTE | OBJECT | |
|---|---|---|
| | DEVICE A | DEVICE B |
| OBJECT ID | 02001 | 02002 |
| <BASIC INFORMATION> | | |
| DEVICE NAME | DEVICE A | DEVICE B |
| ADDRESS | X.X.X.X | Y.Y.Y.Y |
| <CONNECTION PROTOCOL> | | |
| PRINT REQUEST | LPR | LPR |
| FAX TRANSMISSION REQUEST | LPR | LPR |
| TRANSFER OF RECEIVED FAX DOCUMENT | SMTP | SMTP |
| SCAN DOCUMENT TRANSFER | SMTP | SMTP |
| STATUS | SNMP, INDEPENDENT | SNMP, INDEPENDENT |
| <BASIC FUNCTIONS> | | |
| PRINTER FUNCTION | PRESENT | PRESENT |
| PRINTER TYPE | COLOR/PDL2 | MONOCHROME/PDL1 |
| PAPER SIZE | A3 | A4 |
| RESOLUTION | 1200dpi | 600dpi |
| DOUBLE SIDED RECORDING | YES | NO |
| SORTER | PRESENT | NONE |

FIG. 22B

| | | |
|---|---|---|
| FAX FUNCTION | YES | YES |
| COMMUNICATION MODE | G3,G4 | G3 |
| PAPER SIZE | A3 | A4 |
| RESOLUTION | 400x400 | 400x400 |
| PORT NUMBER | 2 | 1 |
| PORT 1 LINE INFORMATION | AAA-AAAA-AAAA | AAA-AAAA-CCCC |
| USE SETTING | TRANSMISSION ONLY | TRANSMISSION AND RECEPTION |
| PORT 2 LINE INFORMATION | AAA-AAAA-BBBB | *** |
| USE SETTING | RECEPTION ONLY | *** |
| SCAN FUNCTION | YES | YES |
| READING PERFORMANCE | MULTIVALUE COLOR | TWO VALUE MONOCHROME |
| PAPER SIZE | A3 | A4 |
| RESOLUTION | 400dpi | 400dpi |
| <ADDITIONAL FUNCTIONS> | | |
| REMOTE LOG REGISTRATION | YES | NO |
| DELIVERY SERVER USER REGISTRATION | YES | YES |
| ... | ... | ... |

FIG. 23

| JOB OBJECT ID | JOB TYPE | STATUS | TRANSFER SOURCE | TRANSFER DESTINATION | DOCUMENT ID | DATA TYPE |
|---|---|---|---|---|---|---|
| 0001 | REGISTRATION | END | DEVICE A | ¥pub¥pub | 0001 | IMAGE |
| 0002 | MAIL | END | DEVICE B | User1@serverA.x.y | 0002 | IMAGE |
| 0003 | FAX TRANSMISSION | AWAITING PROCESSING | USER 1 | SPECIFY DEVICE A | 0003 | IMAGE |
| 0004 | FAX TRANSMISSION | AWAITING PROCESSING | USER 2 | AUTOMATIC DEVICE SELECTION | 0004 | IMAGE |
| 0005 | PRINT | AWAITING PROCESSING | USER 3 | SPECIFY DEVICE B | 0005 | IMAGE |
| ⋮ | | | | | | |

DOCUMENT DELIVERY SYSTEM, DOCUMENT DELIVERY APPARATUS, DOCUMENT DELIVERY METHOD, PROGRAM FOR EXECUTING THE METHOD AND STORAGE MEDIUM STORING THE PROGRAM

BACKGROUND OF THE INVENTION

1. Field of the Invention

The present invention relates to a document delivery system, a document delivery apparatus, a document delivery method, a program for executing the method, and a storage medium storing the program, and more particularly to a document delivery system, a document delivery apparatus, and a document delivery method that are suitable for a delivery server to support document delivery functions in cooperation with a document management server, a mail server, devices and the like located on a network, a program for executing the method, and a storage medium storing the program.

2. Description of the Related Art

Conventionally, systems have existed in which server systems, client systems, and devices are connected on a network. Namely, systems have been proposed in which documents sent from devices on a network are managed by a server system that is provided with an interface for performing communication with the devices and that has a simple document management function. Moreover, these systems have a function of enabling documents managed by the server system to be read in user units on a dedicated client system.

However, there has been the following problem with the above described conventional technology. Namely, there are an increasing number of cases in which document management software having extensive document management functions and groupware software (i.e. software for improving the productivity of a group by performing the sharing and exchange of information using databases, email, and the like) are introduced into basic business operations in order to efficiently manage and use documents which are always on the increase in various types of business. Therefore, there has been a demand that systems that deal with various types of document are capable of operating in cooperation with such software for basic business operations.

SUMMARY OF THE INVENTION

It is a first object of the present invention to provide a document delivery system, a document delivery apparatus, and a document delivery method that are capable of performing automatic delivery processing of document information (e.g. received fax documents and scan documents) that has been created by devices, such as registering the documents in folders of a predetermined document management server, attaching the documents to predetermined email addresses, and outputting the documents to predetermined devices, a program for executing the method, and a storage medium storing the program.

It is a second object of the present invention to provide a document delivery system, a document delivery apparatus, and a document delivery method that are capable of simplifying document retrieval and the like by performing processing at the time when a document is registered in a document management server to automatically register data (for example, the reception time of a received fax document, transmission destination information, and the like) acquired as additional information from a device as index information, a program for executing the method, and a storage medium storing the program.

It is a third object of the present invention to provide a document delivery system, a document delivery apparatus, and a document delivery method that are capable of achieving an improvement in usability for users who use or operate a document management server by automatically reporting to predetermined email addresses the fact that a document has been registered at the time the document is registered in the document management server, a program for executing the method, and a storage medium storing the program.

To attain the first object, the present invention provides a document delivery apparatus connected via a network to a plurality of external devices and a plurality of servers, comprising delivery setting means for making delivery settings for document information received from the external devices, receiving means for receiving document information from the external devices, and delivery means for determining a delivery destination for the received document information, based on the delivery settings, and for delivering the received document information to the determined delivery destination.

Preferably, the delivery destination comprises at least one selected from the group consisting of a document management server that manages documents, a mail server that delivers electronic mails, and an external device that executes jobs.

Preferably, the delivery settings are set for each of the plurality of external devices that are transmission sources of the document information.

Also preferably, the document delivery apparatus comprises control means for controlling the delivery setting means such that delivery settings are made in accordance with instructions from any of the external devices.

In a typical preferred form of the first aspect, the document information comprises information selected from the group consisting of received fax document information and scan document information.

Preferably, when the document information is in a format different from one handled by the delivery destination, the delivery means converts the format of the document information to the one handled by the delivery destination and then delivers the document information to the delivery destination.

In a typical preferred form of the first aspect, the external devices have at least one function selected from the group consisting of an image reading function, and a facsimile transmission and reception function.

To attain the first object, the first aspect of the present invention also provides a document delivery method for controlling a delivery device connected via a network to a plurality of external devices and a plurality of servers, comprising a receiving step of receiving document information from the external devices, and a delivery step of determining a delivery destination for the received document information, based on delivery settings, and delivering the received document information to the determined delivery destination.

To attain the first object, the first aspect of the present invention further provides a document delivery program executed on a computer for controlling a document delivery apparatus connected via a network to a plurality of external devices and a plurality of servers, comprising a receiving step of receiving document information from the external devices; and a delivery step of determining a delivery destination for the received document information, based on delivery settings, and delivering the received document information to the determined delivery destination.

To attain the first object, the first aspect of the present invention further provides a computer-readable storage medium storing a document delivery program for controlling a document delivery apparatus connected via a network to a plurality of external devices and a plurality of servers, comprising a receiving step of receiving document information from the external devices; and a delivery step of determining a delivery destination for the received document information, based on delivery settings, and delivering the received document information to the determined delivery destination.

To attain the first object, the first aspect of the present invention further provides a document delivery system comprising a network, a plurality of external devices, a plurality of servers, and a document delivery apparatus connected via the network to the plurality of external devices and the plurality of servers, the document delivery apparatus comprising delivery setting means for making delivery settings for document information received from the external devices, receiving means for receiving document information from the external devices, and delivery means for determining a delivery destination for the received document information, based on the delivery settings, and for delivering the received document information to the determined delivery destination.

According to the first aspect of the present invention, it is possible to perform automatic delivery processing on document information (e.g. received fax documents and scan documents) that has been created by devices, such as registering the documents in folders of a predetermined document management server, attaching the documents to at least one predetermined email address, and outputting the documents to at least one predetermined device.

To achieve the second object, a second aspect of the present invention provides a document delivery apparatus having a basic construction identical with that of the document delivery apparatus according to the first aspect, which is characterized in that the delivery destination for the received document information comprises a document management server that manages documents, and the delivery means comprises control means for delivering additional information acquired from the external device together with the document information to the document management server as index information, and registering the document information and the index information in the document management server.

In a typical preferred form of the second aspect, the received document information comprises a document received by fax, and the additional information comprises at least one selected from the group consisting of information on a transmitter of the received fax document, reception time information relating to the received fax document, and document page number information.

According to the second aspect of the present invention, it is possible to simplify document retrieval and the like by performing processing at the time when a document is registered in the document management server to automatically register data (for example, the reception time of a received fax document, and transmission destination information) acquired as additional information from any external device as index information.

To achieve the third object, a third aspect of the present invention provides a document delivery apparatus having a basic construction identical with that of the document delivery apparatus according to the first aspect, which is characterized in that the delivery destination for the received document information comprises a document management server that manages documents, and the document delivery apparatus comprises control means operable when the received document information is delivered to the document management server, for notifying by electronic mail to at least one predetermined electronic mail address that the document information has been registered.

According to the third aspect of the present invention, it is possible to achieve an improved usability for a user using the document management server by automatically reporting to predetermined email addresses the fact that a document has been registered at the time the document is registered in the document management server.

The above and other objects, features and advantages of the invention will become more apparent from the following detailed description taken in conjunction with the accompanying drawings.

BRIEF DESCRIPTION OF THE DRAWINGS

FIG. 14 is a view showing an example of object operation commands;

FIG. 20 is a view showing an example of document data flow in the delivery server.

FIG. 21 is a view showing a first example of object attribute values in the delivery server;

FIGS. 22A and 22B is a view showing a second example of object attribute values in the delivery server;

FIG. 23 is a view showing a third example of object attribute values in the delivery server;

FIG. 26 is a view showing the concept of supplying the program and related data of FIG. 25 from the storage medium to a device such as a computer or the like.

DESCRIPTION OF THE PREFERRED EMBODIMENTS

The present invention will now be described in detail with reference to the drawings showing embodiments thereof.

Figure 1:
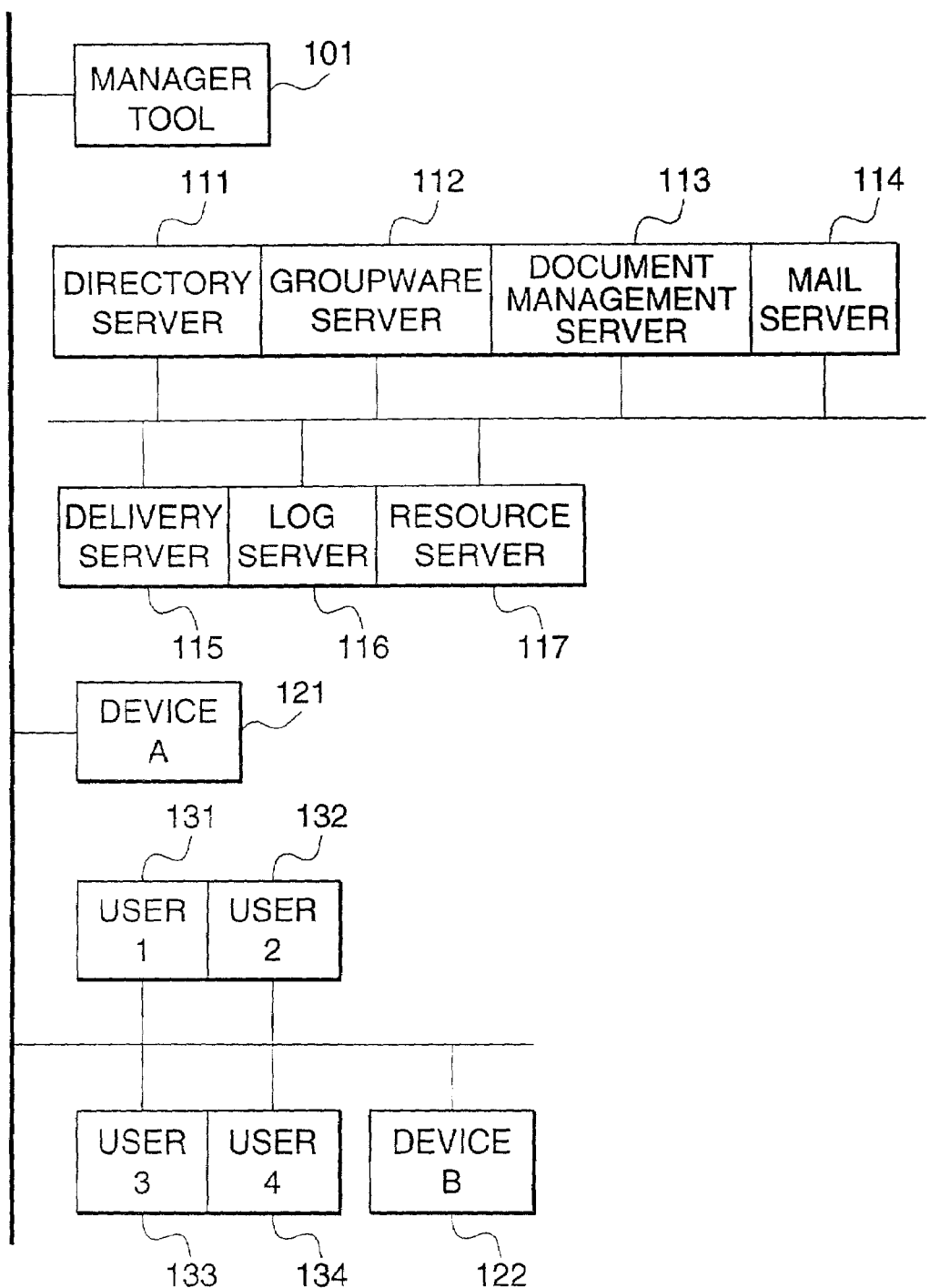
FIG. 1 is a block diagram showing an example of the construction of a document delivery system according to an embodiment of the present invention.

FIG. 1 is a block diagram showing an example of the construction of a document delivery system according to an embodiment of the present invention. The document delivery system according to the present embodiment is comprised of a manager tool 101, a directory server 111, a groupware server 112, a document management server 113, a mail server 114, a delivery server 115, a log server 116, a resource server 117, a device A 121, a user 1 131, a user 2 132, a user 3 133, a user 4 134, and a device B 122. These components are connected via a network.

The manager tool 101 represents clients used by the network manager and is provided with tools for performing management and the like of various types of network resources (i.e. servers and devices) from the manager tool 100. The directory server 111 is one available on the market and allows users to perform centralized management of various network resources at their locations. In the present system as well, necessary objects are defined and the directory server 111 is adapted to utilize them. The groupware server 112 is one available on the market and is intended to be operated at users' locations. The document management server 113 is one available on the market and is intended to be operated at users' locations. The mail server 114 is one available on the market and is intended to be operated at users' locations.

The delivery server 115 is a server peculiar to the present embodiment and provides various types of delivery functions. The log server 116 is a server peculiar to the present embodiment and performs collective management of information resulting from processing of various jobs by the respective devices and servers on the network. The resource server 117 is a server peculiar to the present embodiment and performs collective management of various types of resource that are necessary for job processing using various types of device. The device A 121 and device B 122 are devices peculiar to the present embodiment. They are connected to the network and provide various types of functions. The users 1 to 4 131 to 134 represent user terminals on the network.

Figure 2:
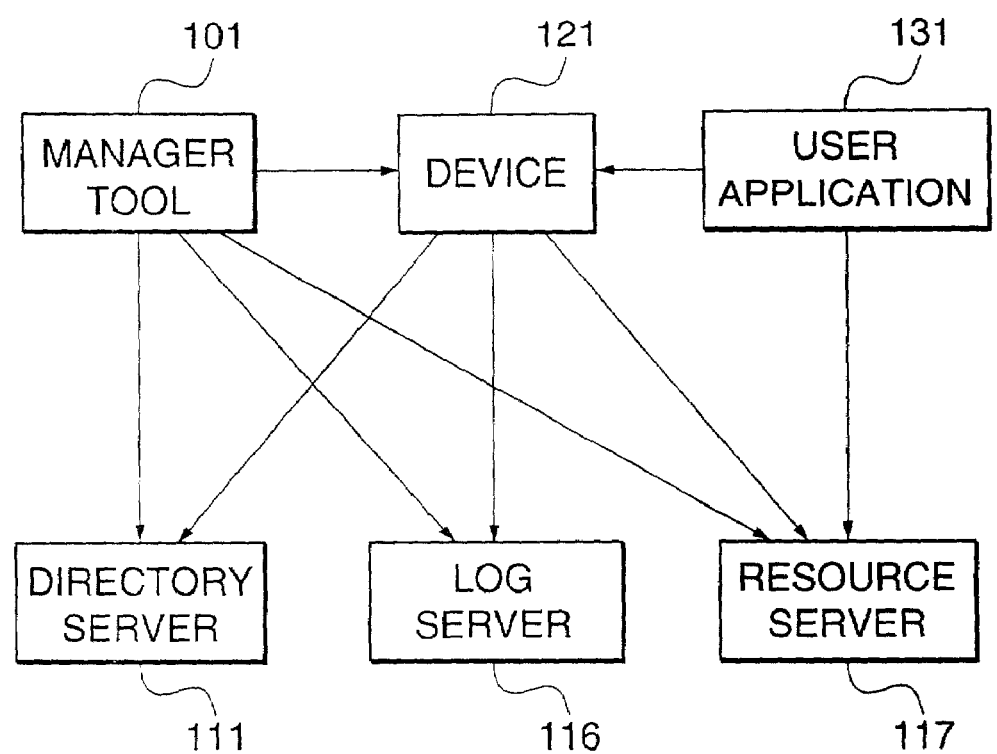
FIG. 2 is a view showing a device operating method.

FIG. 2 is a view useful in explaining the device operating method used by the document delivery system. The manager tool 101 is provided with means for detecting the device 121 and registering functions thereof in the directory server 111, and also with means for making various settings for the device 121. The manager tool 101 is also provided with means for making various settings for the log server 116 and the resource server 117, and also with means for registering access information, function information, and the like thereof in the directory server 111.

The device 121 is provided with means for obtaining access information from the manager tool 101, and accessing the directory server 111, the log server 116, and the resource server 117 and handling information obtained therefrom, as required. Moreover, the user 131 can obtain necessary resources from the resource server 117 when the device 121 is used by the user 131.

Figure 3:
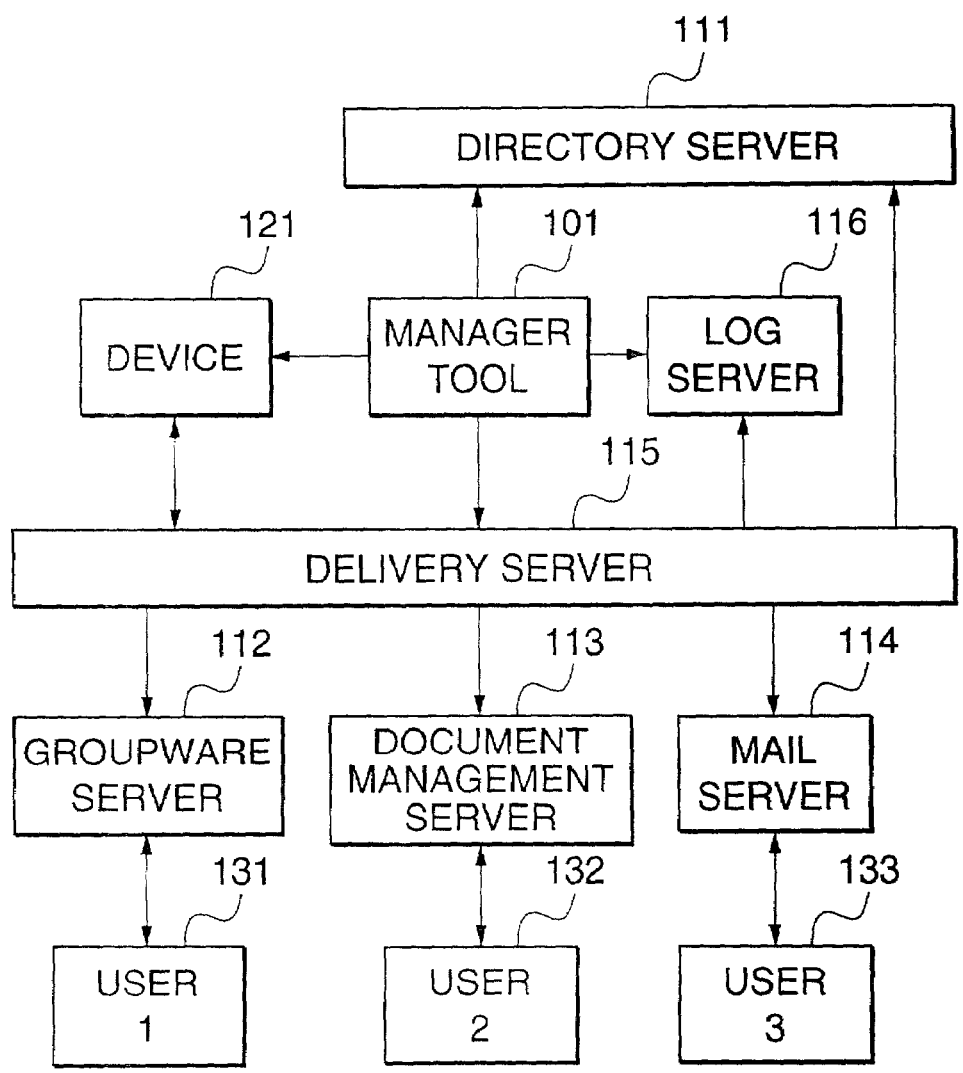
FIG. 3 is a view showing a document delivery method.

FIG. 3 is a view useful in explaining the document delivery method used by the document delivery system. The delivery server 115 has interfaces with the device 121, the groupware server 112, the document management server 113, and the mail server 114 while the users 1 to 4 131 to 134 are clients for various types of server (i.e. the groupware server 112, the document management server 113, and the mail server 114).

In this environment, the delivery server 115 delivers document information (received faxes, scan information, and the like) from the device 121 to the users 131 to 133 via various servers (i.e. the groupware server 112, the document management server 113, and the mail server 114), and also delivers jobs from the users 131 to 133 to the device 121. In addition, the results of processing of various jobs by the delivery server 115 can be registered in the log server 116. It should be noted that settings for the overall system are made by the manager tool 101 and when necessary, the manager tool 101 can access the directory server 111 and carry out updating and the like of information necessary for operating the system.

Figure 4:
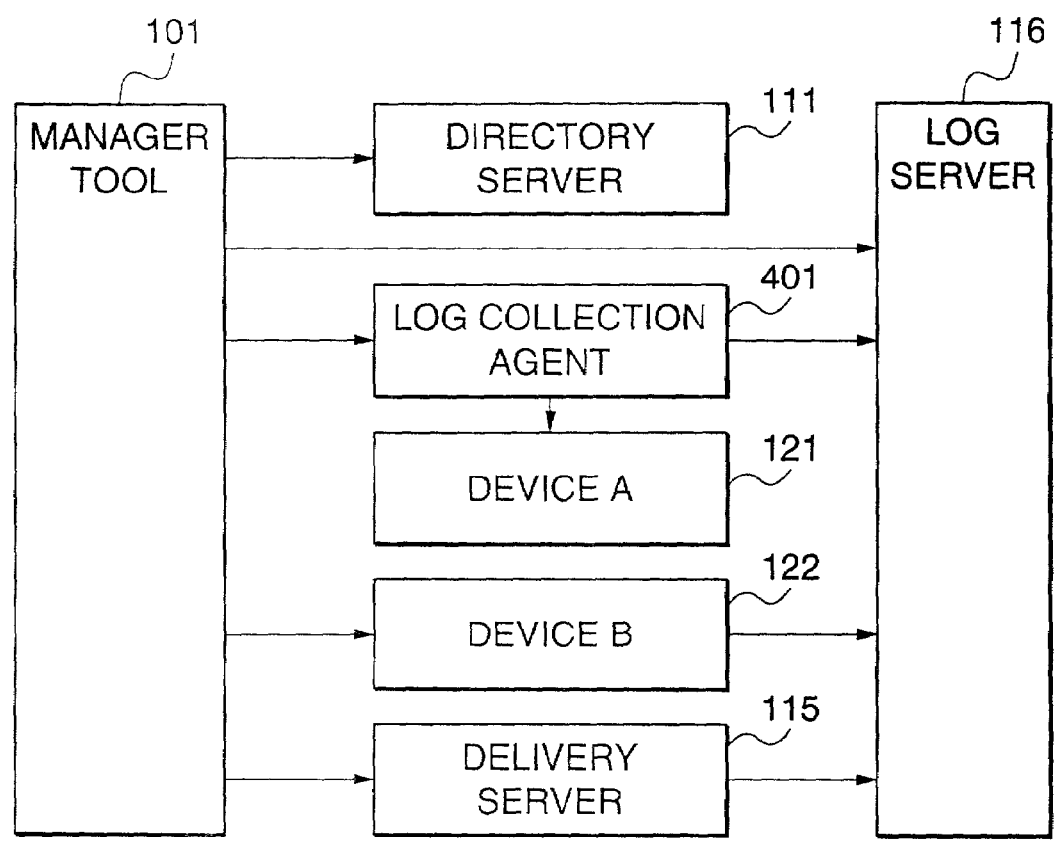
FIG. 4 is a view showing a log collection method.

FIG. 4 is a view useful in explaining the log collection method used by the document delivery system. There are typically three ways to make a registration to the log server 116 and these will be described below.

(1) Direct registration from the device: The manager tool 101 gives an instruction to the device 122 for remote log registration (i.e. registration contents, registration units, registration server information, and the like), to perform log registration from the device 122 directly in the log server 116.

(2) Registration by log collection agent: This method is for a case where the device 121 has no function of directly performing log registration to the log server 116 even if it has a log notification function. A log collection agent 401 is provided as a sub function of the log server 116 and log information from the device 121 is temporarily collected in the log collection agent 401 and then the data collected in the agent 401 is registered to the log server 116. The device to which this registration is applied is not limited to the device 121, but the settings relating to from which device what information is to be acquired, and to which server is the data to be registered are performed by the manager tool 101.

(3) Log registration from the delivery server: This is a method in which the results of processing of jobs by the delivery server 115 are registered directly in the log server 116. Predetermined settings are made by the manager tool 101.

It should be noted that the present embodiment is constructed such that processings such as managing and analysis of the log information collected in the log server 116 can be performed by the manager tool 101.

Next, a description will be given of the internal constructions of the group of devices and servers in the document delivery system.

Figure 5:
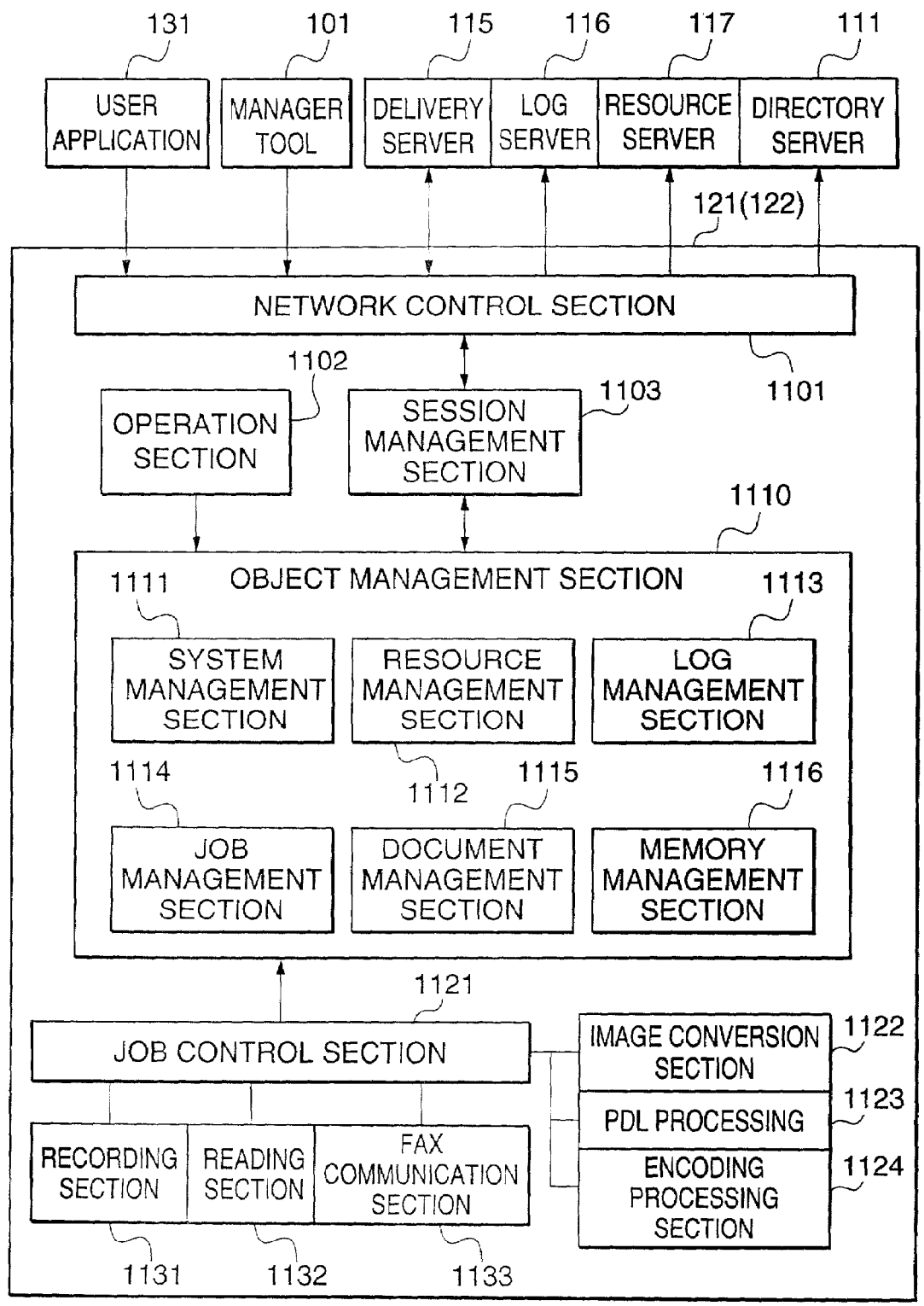
FIG. 5 is a block diagram showing an example of the construction of devices.

FIG. 5 is a block diagram showing an example of the construction of the devices 121 and 122 in the document delivery system. The devices are each roughly formed of the following function blocks as main blocks:

(1) Operating section 1102: This is the same as an operating section installed in an ordinary device and forms a part of the device. The operating section 1102 is used for various types of registration, settings, and job instructions;

(2) Network control section 1101: Here, interfaces with various network resources and a variety of functions are provided to provide the following functions, for example:

receiving jobs from the user application 131;
receiving remote management operation from the manager tool 101;
handling data such as jobs with the delivery server 115;
remote registration of log information in the log server 116;
obtaining necessary resources from the resource server 117; and
obtaining necessary information from the directory server 111.

(3) Object management section 1110: This section forms the core of the device system. Various types of data groups relating to jobs that are managed and supported by the device are defined as objects and by accessing these objects from associated function sections, the functions can be performed.

A system management section 1111 is a section for managing system objects.
A resource management section 1112 is a section for managing resource objects.
A log management section 1113 is a section for managing log objects.
A job management section 1114 is a section for managing job objects.
A document management section 1115 is a section for managing document objects.
A memory management section 1116 manages various objects in a device memory.

(4) Job control section 1121: Control of various types of job is performed here by providing interfaces between the object management section 1110 and various function sections shown below.

A recording section 1131 performs printing control of print data.
A reading section 1132 performs reading control of images from a scanner.
A FAX communication section 1133 performs control of transmission and reception of faxes.

The following data conversion processing is also performed as required.

An image conversion section 1122 performs image conversion processing such as converting the resolution, and paper size.
A PDL (Page Description Language) processing section 1123 performs processing of rendering PDL data.
An encoding processing section 1124 performs processing of code conversion of images.

(5) Session control section 1103: Here, sessions relating in particular to access from the network side are managed and this management also serves as control of access to the object management section 1110.

Figure 6:
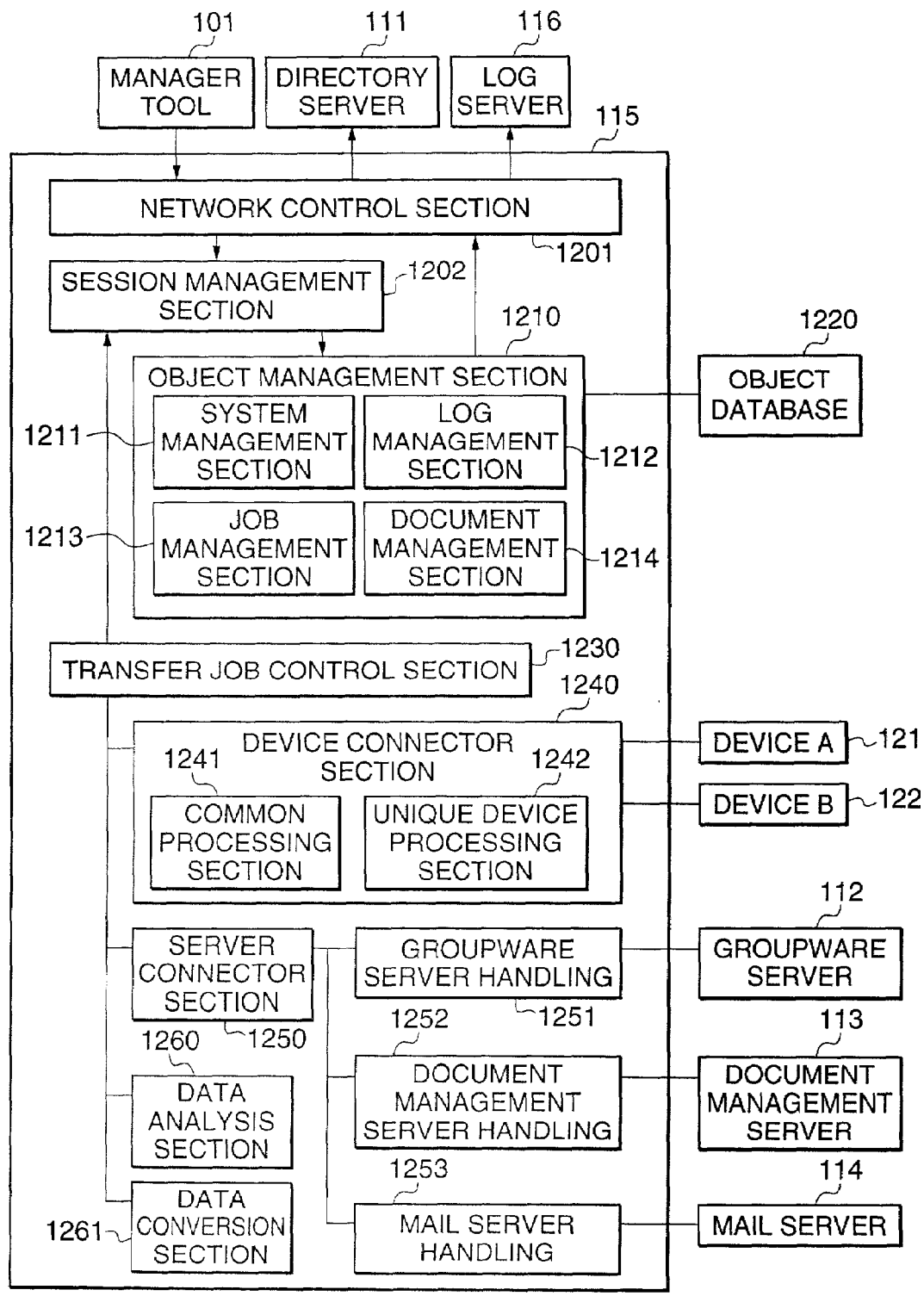
FIG. 6 is a block diagram showing an example of the construction of a delivery server.

FIG. 6 is a block diagram showing an example of the construction of the delivery server 115 of the document delivery system. The delivery server 115 is roughly formed of the following function blocks as main blocks.

(1) Network control section 1201: Here, interfaces are provided with various types of network resource to provide the following functions, for example:

receiving remote management operation from the manager tool 101;
remote registration of log information in the log server 116; and
obtaining necessary information from the directory server 111.

(2) Object management section 1210: Various types of data groups of jobs that are managed and supported by the delivery server 115 are defined as objects and by accessing these objects from associated functions sections, the functions can be performed.

A system management section 1211 is a section for managing system objects.
A log management section 1212 is a section for managing log objects.
A job management section 1213 is a section for managing job objects.
A document management section 1214 is a section for managing document objects.
An object database 1220 is a database for managing various types of object. A database engine that is used may be a general purpose database engine and may be provided inside the server or outside the server.

(3) Transfer job control section 1230: Control of various types of job is performed here by providing interfaces between the object control section 1210 and various function sections shown below.

A device connector section 1240 supports interfaces with the devices and handles information such as job data, and status. Internally, the section 1240 is provided with a common processing section 1241 for performing processing common between the devices, and with a unique device processing section 1242 for use when processing unique to a device is performed.
A server connector section 1250 supports interfaces with various server applications and handles various types of data. Here, a groupware server handling section 1251, a document management server handling section 1252, and a mail server handling section 1253 are depicted, however, an interface for handling each application may be provided for each marketed server application.
A data analysis section 1260 analyzes document data that has been transferred from various devices and servers as well as additional information for transfer instructions and performs preliminary processing and the like for internal transfer job creation.
A data conversion section 1261 converts the format of the document data and the like into a format that can be handled by the device or server at the transfer destination, as required.

(4) Session control section 1202: Here, unscheduled access from the network control section, the transfer job control section, and the like to the object control section 1210 is managed.

Figure 7:
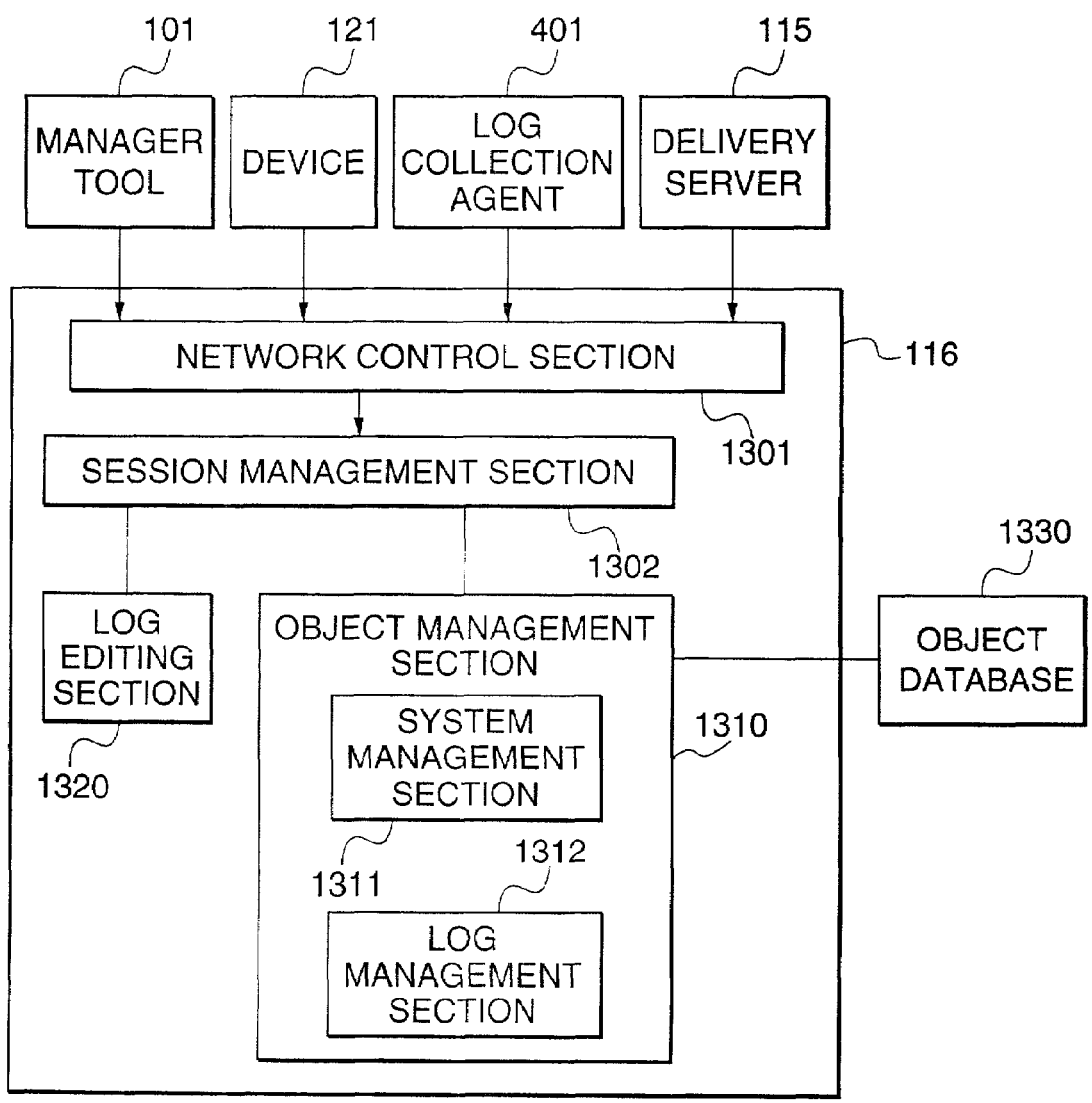
FIG. 7 is a block diagram showing an example of the construction of a log server.

FIG. 7 is a block diagram showing an example of the construction of the log server 116 of the document delivery system. The log server is formed of the following function blocks as main blocks.

(1) Network control section 1301: Here, interfaces are provided with various network resources to provide the following functions, for example:

receiving remote management operation from the manager tool 101;
receiving log registration requests from a device (e.g. 121);
receiving log registration requests from the log collection agent 401; and
receiving log registration requests from the delivery server 115.

(2) Object management section 1310: Log data groups and the like that are managed by the log server 116 are defined as objects and by accessing these objects from associated function sections, the functions can be performed.

A system management section 1311 is a section for managing system objects.

A log management section 1312 is a section for managing log objects.

An object database 1320 is a database for managing various types of object. A database engine that is used may be a general purpose database engine and may be provided inside the server or outside the server.

(3) Log editing section 1320: This section supports the function of editing the managed log data into a format that can be easily handled on the manager tool side.

(4) Session management section 1302: Here, unscheduled access from the network control section 1301 to the object management section 1310 is managed.

Figure 8:
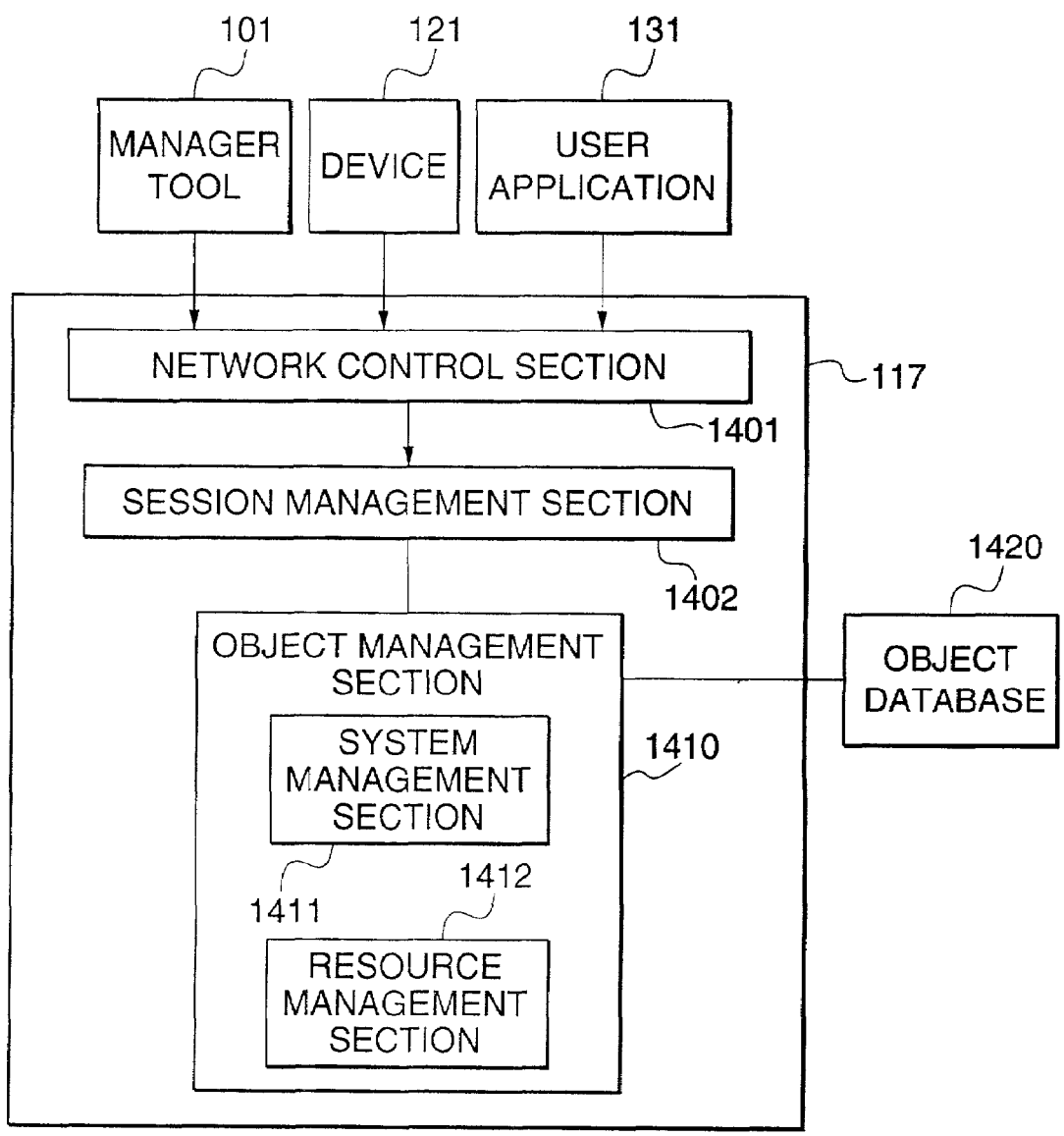
FIG. 8 is a block diagram showing an example of the construction of a resource server.

FIG. 8 is a block diagram showing an example of the construction of the resource server 117 of the document delivery system. The resource server is formed mainly of the following function blocks.

(1) Network control section 1401: Here, interfaces are provided with various network resources to provide the following functions, for example:

receiving remote management operation from the manager tool 101;

receiving resource requests from a device (e.g. 121); and receiving resource requests from a user application (e.g. 131).

(2) Object management section 1410: Resource data groups and the like that are managed by the resource server 117 are defined as objects and by accessing these objects from associated functions sections, the functions can be performed.

A system management section 1411 is a section for managing system objects.

A resource management section 1412 is a section for managing log objects.

An object database 1420 is a database for managing various types of object. A database engine that is used may be a general purpose database engine and may be provided inside the server or outside the server.

(3) Session management section 1402: Here, unscheduled access from the network control section 1401 to the object management section 1410 is managed.

Next, a description will be given of object models used in the device and server groups in the document delivery system.

Figure 9:
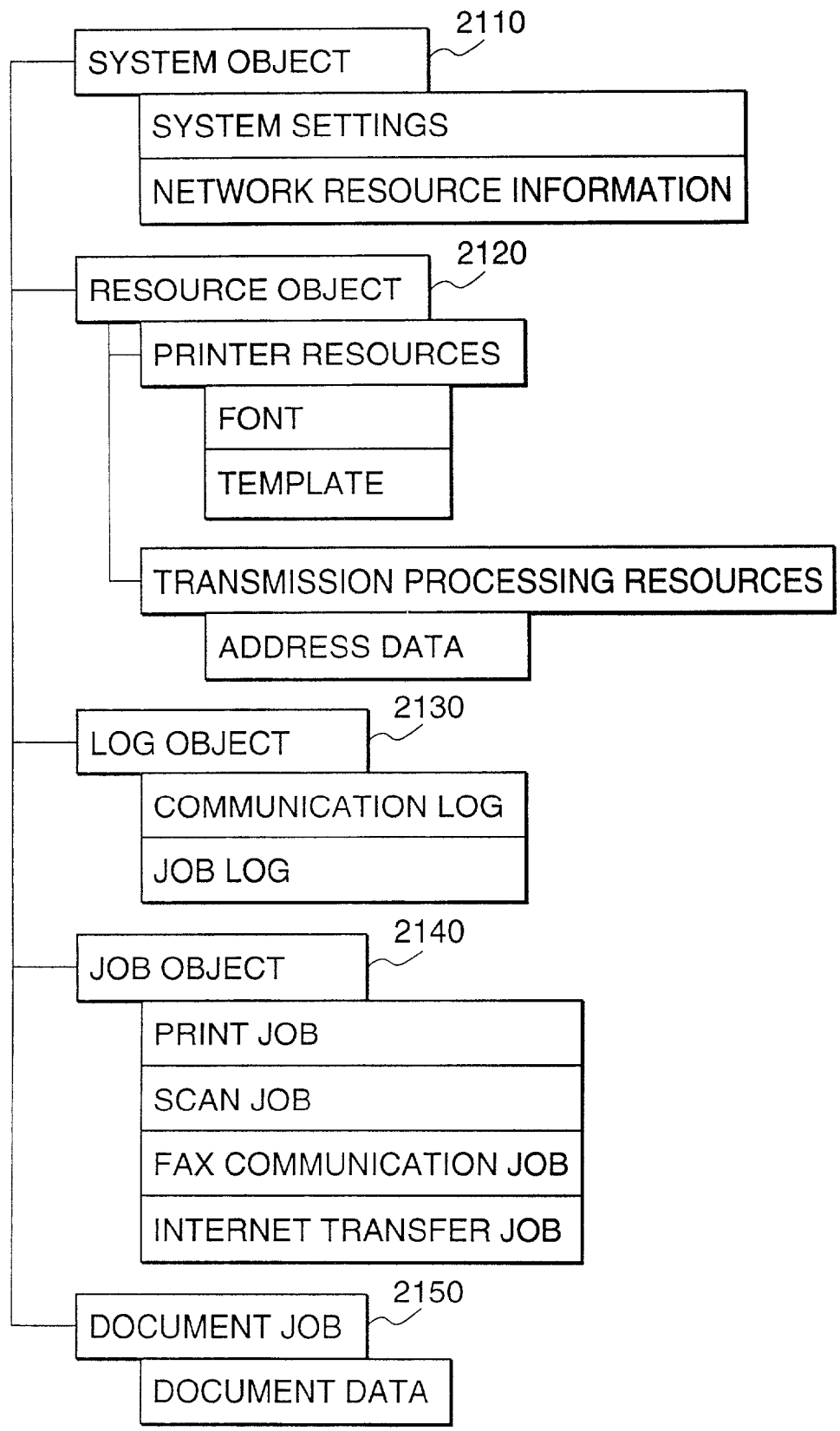
FIG. 9 is a view showing an example of an object model used in a device.

FIG. 9 is a view useful in explaining an example of object models used by the devices 121 and 122 of the document delivery system. Mainly, the following objects are defined and used.

(1) System object 2110: Various types of system information that become necessary when the device system is operated are defined as attributes and then used. The following are child objects of this object.

System setting objects: Various types of user data, service data, and the like that become necessary for the device to be operated are defined as attribute values and used.

Network resource information objects: Access information on network resources that can be accessed from the device, function information, and the like are defined as attribute values and used.

(2) Resource object 2120: Various types of resources that become necessary when the device system is operated are managed and used as objects. The following are child objects of this object.

Printer resource objects: Font data and template data for overlay processing are used as objects as resources for printer functions.

Transmission processing resource objects: Data such as FAX transmission addresses and network user addresses are used as objects.

(3) Log object 2130: Various types of log data that result from operation of the device system are managed and used as objects. The following are child objects of this object.

Communication logs: Communication log data relating to FAX transmissions and receptions are used as objects.

Job logs: Log data such as print logs (for example, printing, print number, print time, person printing, etc are defined as attribute values), scan logs (for example, the number of scans per day etc is defined as an attribute), and error logs (communication errors, print jams, scan jams and the like are defined as attributes) are used as objects.

(4) Job object 2140: Job instruction data that corresponds to the functions supported by the device system are managed and used as objects. The following are child objects of this object.

Print jobs: Print instruction data is used as an object.

Scan jobs: Reading instruction data (reading mode, data specifying the destination for transferring the scan data, and the like are defined as attributes and used) is used as an object.

FAX transmission jobs: Fax transmission instruction data is used as an object.

Network transfer jobs: Instruction information for transferring various types of data via the network is used as an object.

It should be noted that the entities of the document data and the like are managed as a document object. When document data that corresponds to a job exists, the ID of the object indicating that entity is specified as attribute information.

(5) Document object 2150: Document data used for the execution of a job (print data, FAX transmission data, and the like), document data created after the execution of a job (scan data, FAX reception data, and the like), and the like are managed and used as objects.

Figure 10:
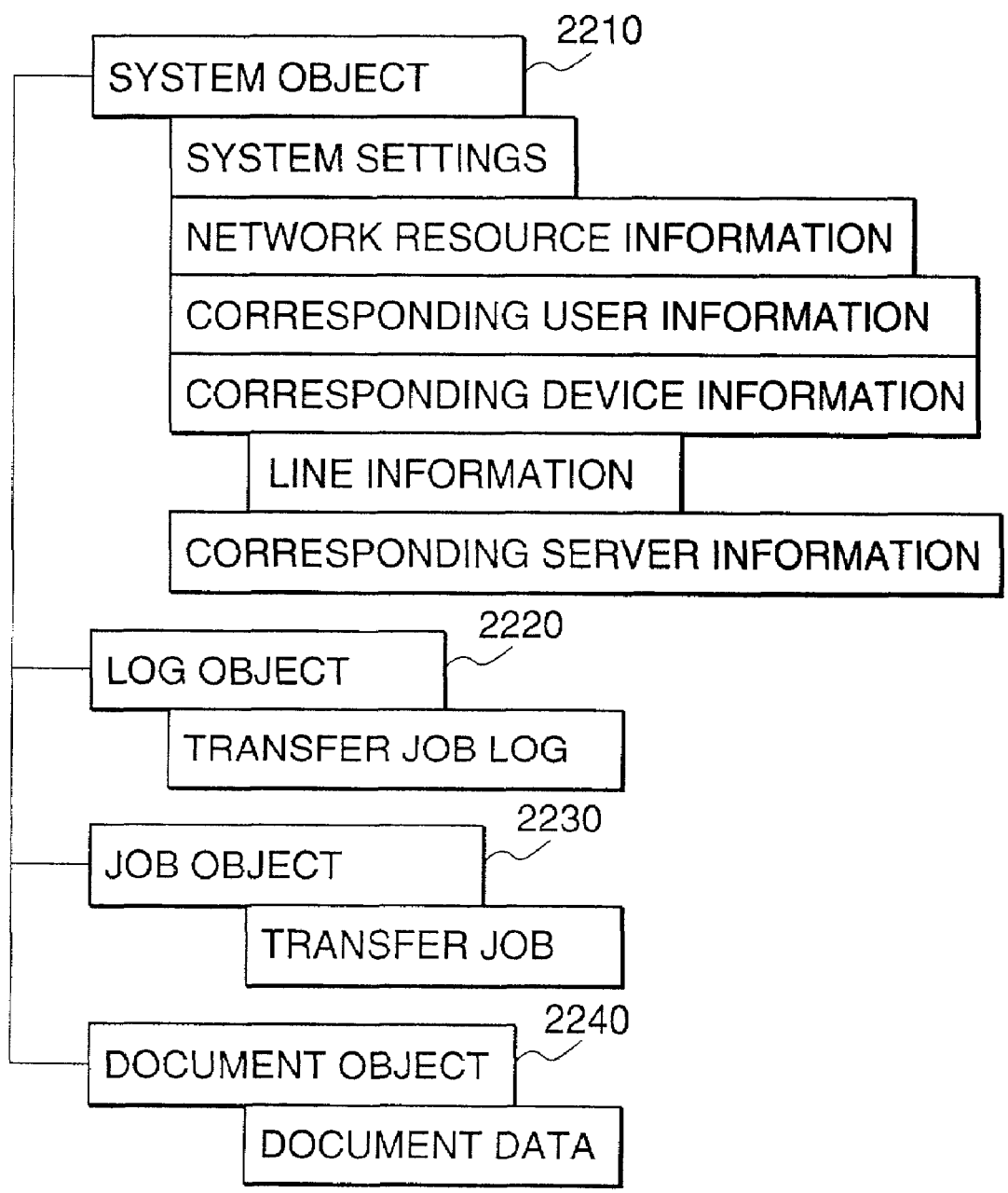
FIG. 10 is a view showing an example of an object model used in a delivery server.

FIG. 10 is a view useful in explaining an example of object models used by the delivery server 115 of the document delivery system. Mainly, the following objects are defined and used.

(1) System object 2210: Various types of system information that become necessary when this server is operated are defined as attributes and then used. The following are child objects of this object.

System setting objects: Various types of setting data and the like that become necessary for the server to be operate are defined as attribute values and used.

Network resource information objects: Access information on network resources that can be accessed from this server, function information, and the like are defined as attribute values and used.

Corresponding user information objects: Various types of information relating to users using this server are defined as attribute values and used.

Corresponding device information objects: Various types of information relating to device groups that are connected to this server and then operated are defined as attribute values and used.

Corresponding server information objects: Various types of information relating to server groups that are connected to this server and then operated are defined as attribute values and used.

(2) Log object 2220: Log data relating to various types of transmission jobs that result from operation of this server are managed and used as objects.

(3) Job object 2230: Instruction data that relates to the transmission processing supported by the device system is managed and used as an object.

It should be noted that the entities of the document data and the like are managed as a document object. When document data exists that corresponds to a job, the ID of the object indicating the entity thereof is specified as attribute information.

(4) Document object 2240: Various types of document data used for the execution of a job are managed and used as objects.

Figure 11:
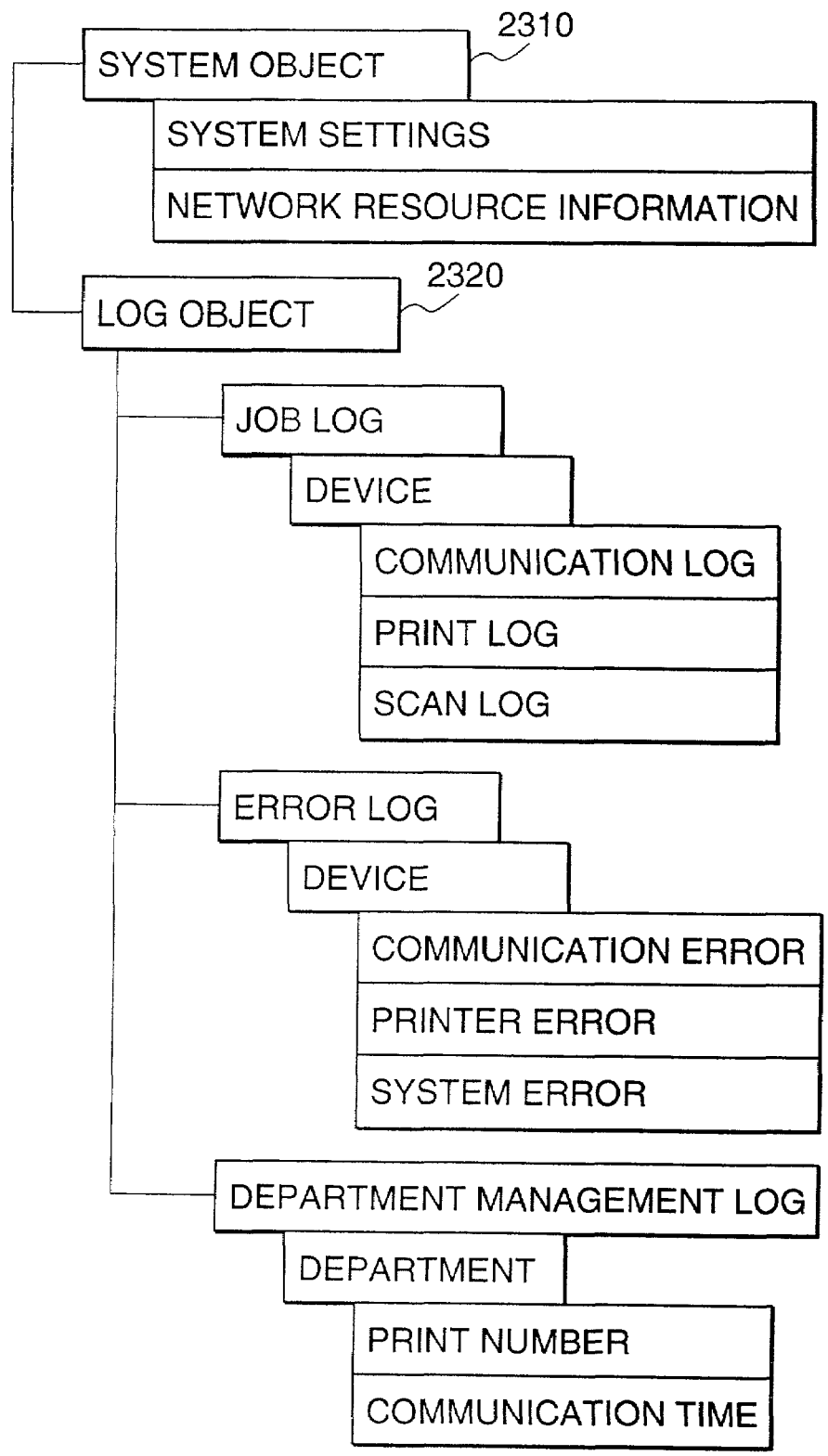
FIG. 11 is a view showing an example of an object model used in a log server.

FIG. 11 is a view useful in explaining an example of object models used by the log server 116 of the document delivery system. Mainly, the following objects are defined and used.

(1) System object 2310: Various types of system information that become necessary when this server is operated are defined as attributes and then used. The following are child objects of this object.

System setting objects: Various types of setting data and the like that become necessary for the server to be operated are defined as attribute values and used.

Network resource information objects: Access information for network resources that can be accessed from this server, function information, and the like are defined as attribute values and used.

(2) Log object 2320: Various types of log data reported from various types of devices and server groups that are to be managed on the network are managed and used as objects. The following are child objects of this object.

Job log objects: Here, data such as communication logs, print logs, and scan logs can be managed in units of each device.

Error log objects: Here, data such as communication errors, printer errors, and system errors can be managed in units of each device.

Department management log objects: Here, data such as print numbers, and communication time can be managed in departmental units. It should be noted that the defining of a department may be in user units, device units, or in units formed by grouping these together and is an operational matter.

Figure 12:
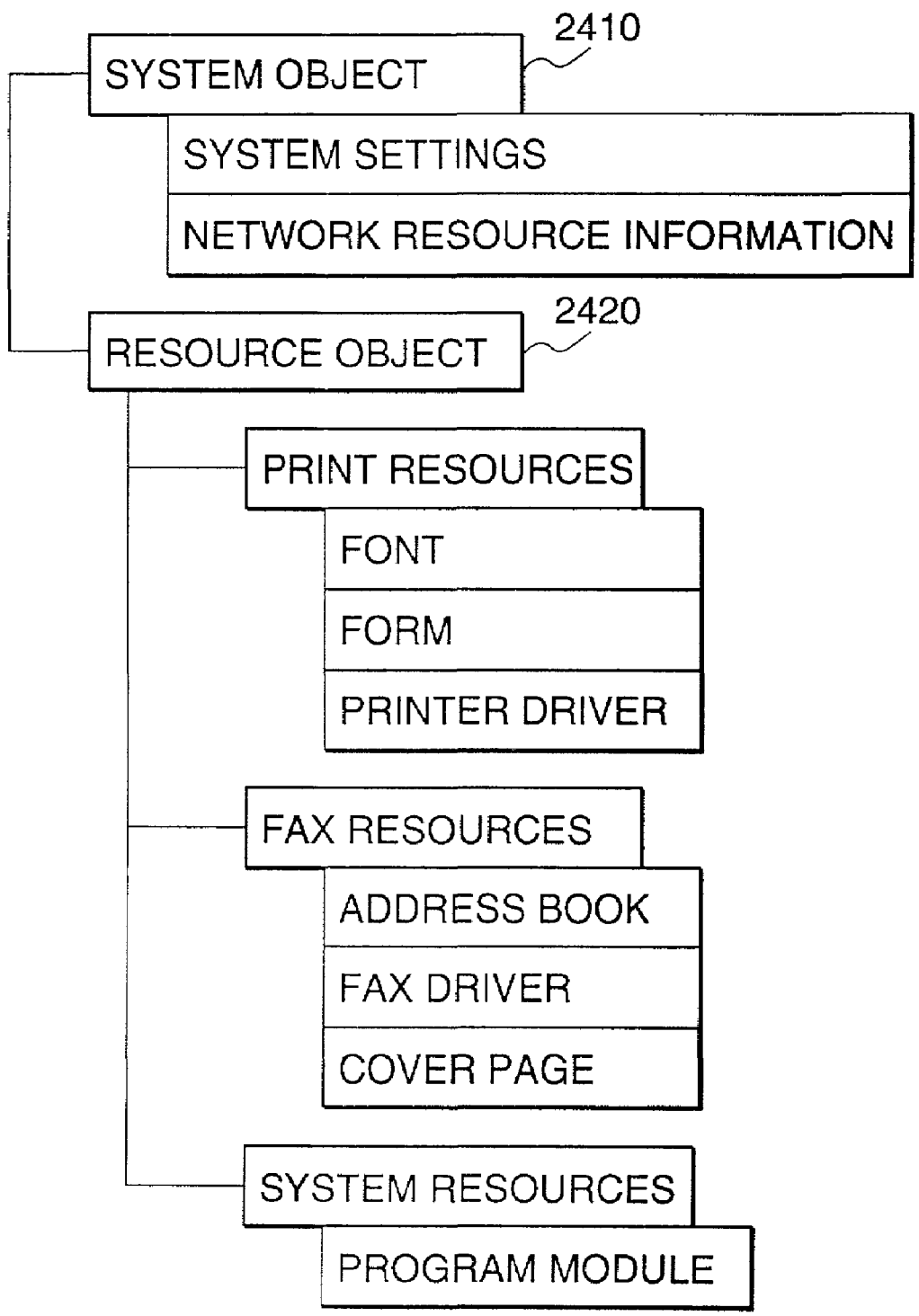
FIG. 12 is a view showing an example of an object model used in a resource server.

FIG. 12 is an example of object models used by the resource server 117 of the document delivery system. Mainly, the following objects are defined and used.

(1) System object 2410: Various types of system information that become necessary when this server is operated are defined as attributes and then used. The following are child objects of this object.

System setting objects: Various types of setting data that become necessary for the server to be operated are defined as attribute values and used.

Network resource information objects: Access information for network resources that can be accessed from this server, function information, and the like are defined as attribute values and used.

(2) Resource object 2420: Various types of resource data managed by this server are managed and used as objects. The following are child objects of this object.

Printer resource objects: Various types of font data used in printing processing, form data used for overlay processing, printer drivers that correspond to each printer device, and the like are managed and used as objects.

FAX resource objects: Address data used for FAX transmission instructions, FAX drivers used when a FAX transmission is instructed from a user application, cover paper data, and the like are managed and used as objects.

System resource objects: Firmware (programs) of each device, update modules of server components, and the like are managed and used as objects.

Figure 13:
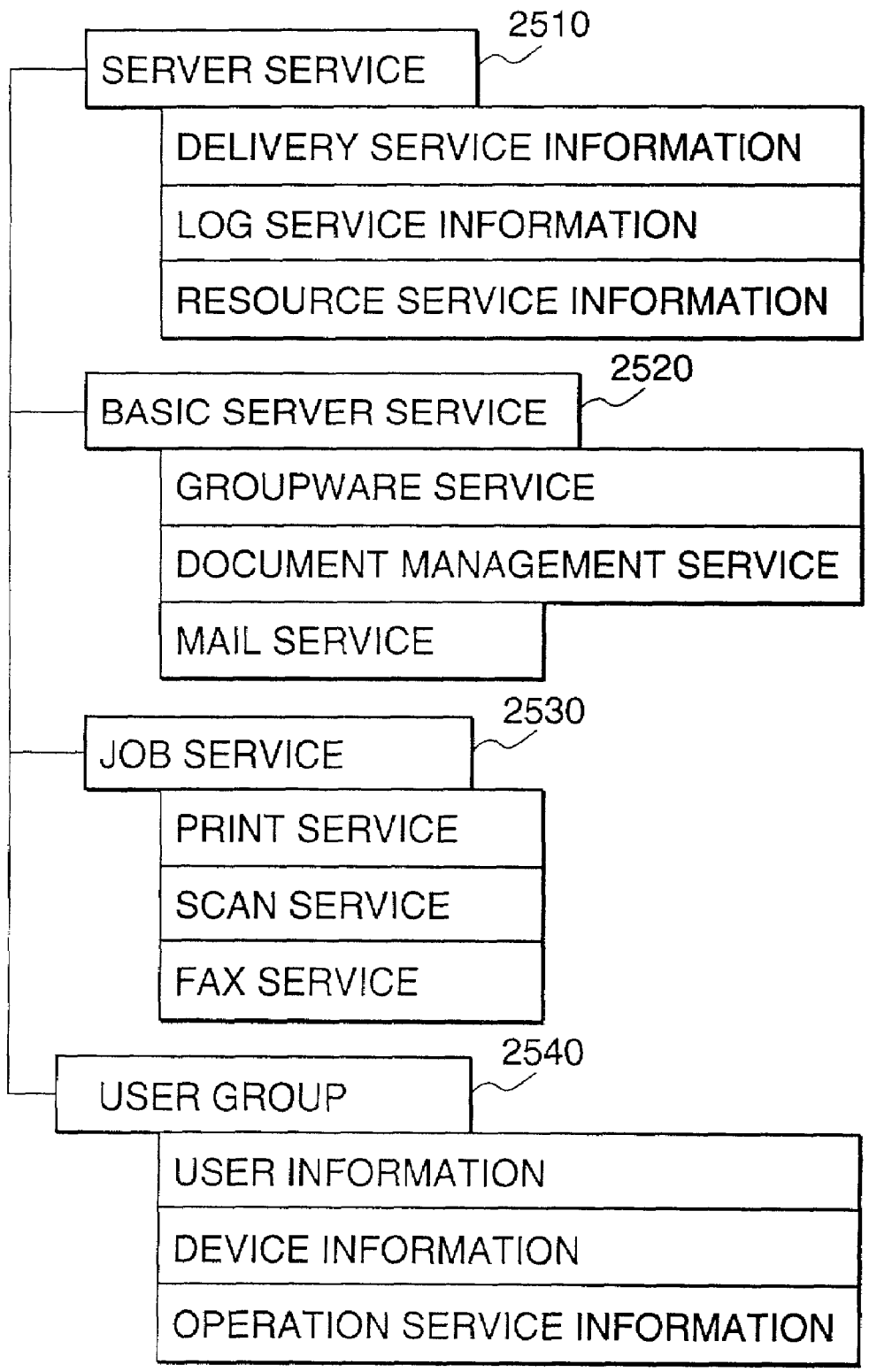
FIG. 13 is a view showing an example of an object model used in a directory server.

FIG. 13 is a view useful in explaining an example of object models used by the directory server 111 of the document delivery system. Various types of information that are valid when various types of network resource forming the present system as well as the present system itself are operated can be defined and used as objects. The following are examples of such objects.

(1) Server service object 2510: Information elements which are valid for operation of the present system such as access information for accessing the delivery server, the log server, the resource server and the like used in the present embodiment which are located on the network, information on supported functions, and the like can be defined as attributes and used.

(2) Basic server service object 2520: Information elements which are valid for operation of the present system such as access information relating to server groups that support basic business operations such as various types of groupware server, the document management server, the mail server and the like, which are located on the network, can be defined as attributes and used.

(3) Job service object 2530: Information relating to print functions, scan functions, FAX functions, and the like provided by various devices and the delivery server located on the network (for example, information relating to what type of function (i.e. service) can be executed where) can be handled as information elements and defined as attributes and made use of (referred to).

(4) User group object 2540: User information, device information and the like that are formed for operation of the present system can be managed and used as objects.

Next, a description will be given of the method and processing of operating various types of object used in the device and server groups in the document delivery system.

FIG. 14 is a view useful in explaining an example of object operation commands applied by the entire document delivery system. Basically, by providing means for performing operation of objects using command groups shown below, the functions of the server system and device system according to the present embodiment can be managed and executed.

(1) Create Object: This command implements creation of a new object (i.e. a job, a document, etc)

(2) Open Object: This command specifies an object and starts operation (i.e. reading or writing of attribute values or data) thereof.

(3) Close Object: This command ends operation of a specified object.

(4) Delete Object: This command deletes a specified object.

(5) Read/Write Attribute: This command implements reading or writing of attribute values for an opened object.

(6) Read/Write Data: This command implements reading or writing of data for an opened object.

(7) Search Object: This command implements searching for the existence of an object.

(8) Search Attribute: This command implements searching for attributes existing within an object.

Figure 15:
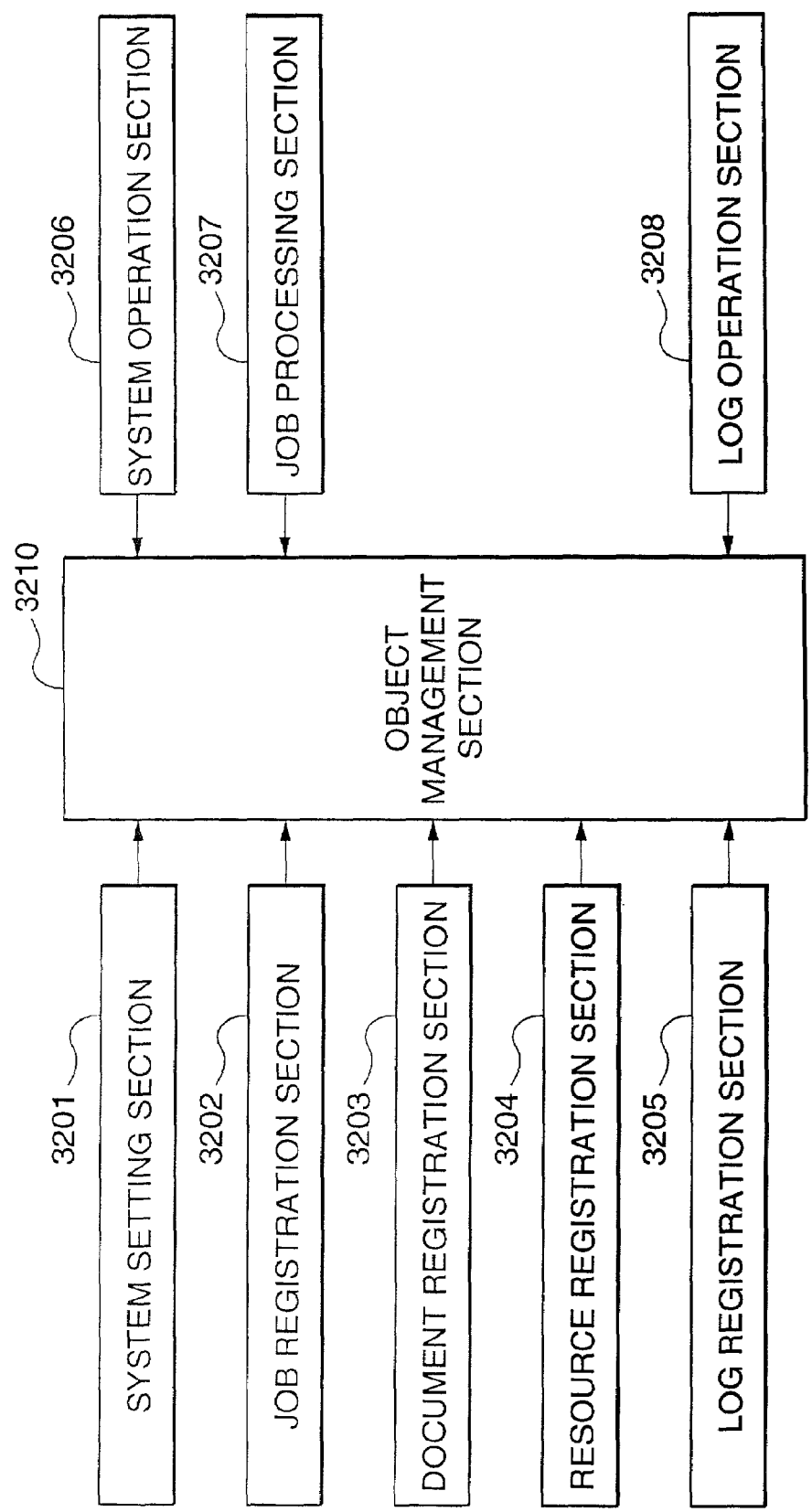
FIG. 15 is a view showing an example of the operation of objects.

FIG. 15 is a view useful in explaining the operation of objects applied by the entire document delivery system. The mode of management and operation of objects is basically the same between the devices and the servers of the present embodiment and takes a processing mode such as the following.

An object management section 3210 performs centralized management of the objects and responds to operations such as read and write from the respective function sections. A system setting section 3201 corresponds, for example, to an interface section with the operating section and the manager tool and handles data relating to system setting information with the object management section. A job registration section 3202 and a document registration section 3203 correspond, for example, to an interface section with the operating section and user applications, and to a job control section for creating jobs within the system and handle data relating to job instructions with the object management section.

A resource registration section 3204 corresponds, for example, to an interface section with the manager tool and the resource server and handles data relating to resources with the object management section. A log registration section 3205 corresponds, for example, to the job control section within the system and a section for handling log information on the network and handles data relating to logs with the object management section.

A system operation section 3206 corresponds to all function sections that are required to control the system operation based on the system setting information and acquires data relating to the system setting information from the object management section 3210. A job processing section 3207 corresponds to the job control section within the system and handles job data, document data, resource data and the like with the object management section. A log operation section 3208 corresponds to a function section for referring to log data and obtains log data from the object management section.

Figure 16:
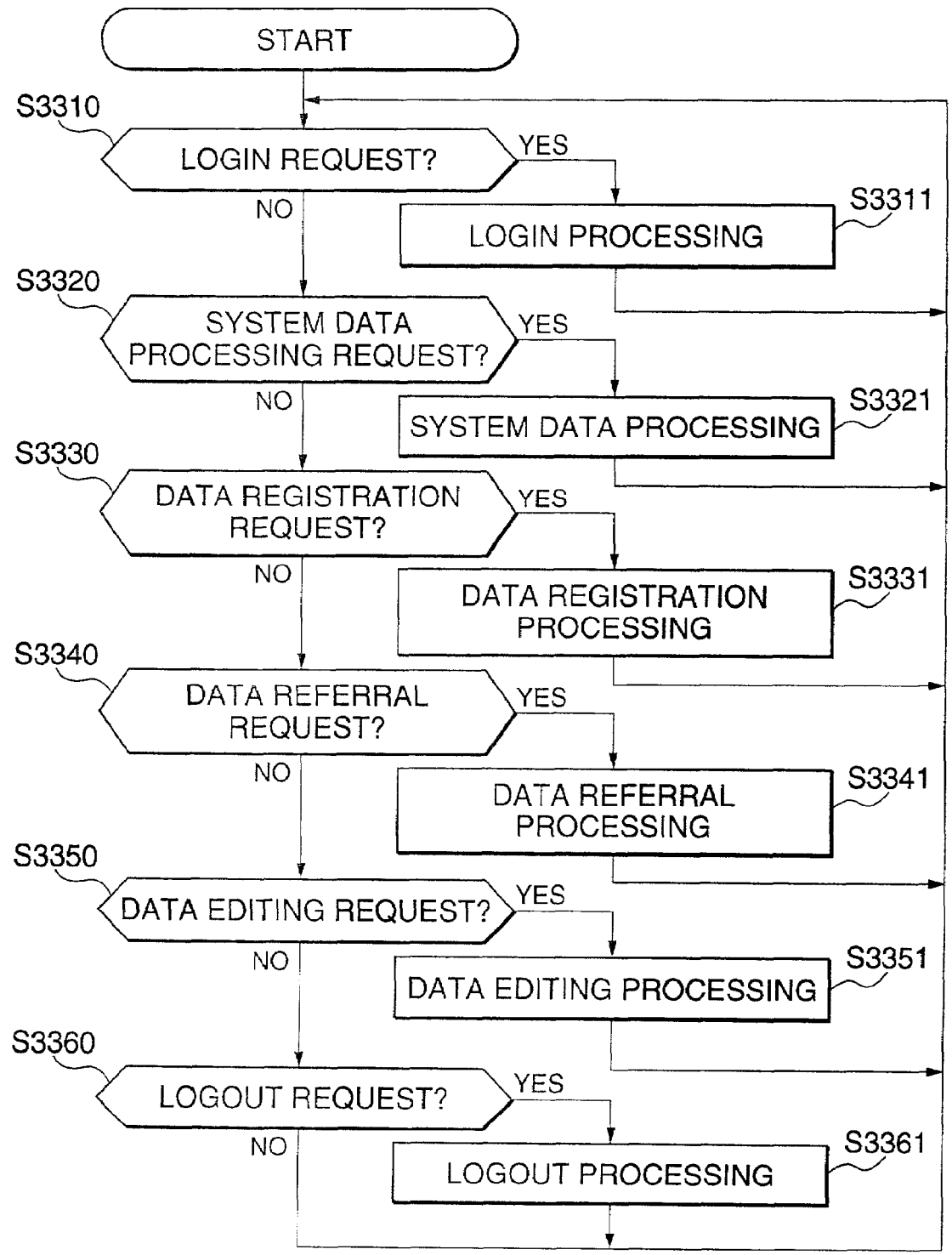
FIG. 16 is a flow chart showing object processing in the log server.

FIG. 16 is a flow chart showing an example of object processing executed by the log server 116 of the document delivery system. If, in step S3310, a login request is made, then in step S3311, login processing such as verification of the person requesting the access and session opening is performed. In step S3320, if a system data processing request is made, then, in step S3321, system data update processing and the like is performed in accordance with the request. If a data registration request is made in step S3330, then, in step S3331, registration processing is performed on the transferred log data.

If a data referral request is made in step S3340, then, in step S3341, the requested data referral is made and the result is reported. If a data editing request is made in step S3350, then, in step S3351, in the requested data editing section the necessary data is obtained from the object management section, edited, and the result is reported. In step S3360, if a logout request is made, then, in step S3361, logout processing such as session closing is performed. Various types of data registration, updating, and referral processing are performed by accessing the object management section.

Figure 17:
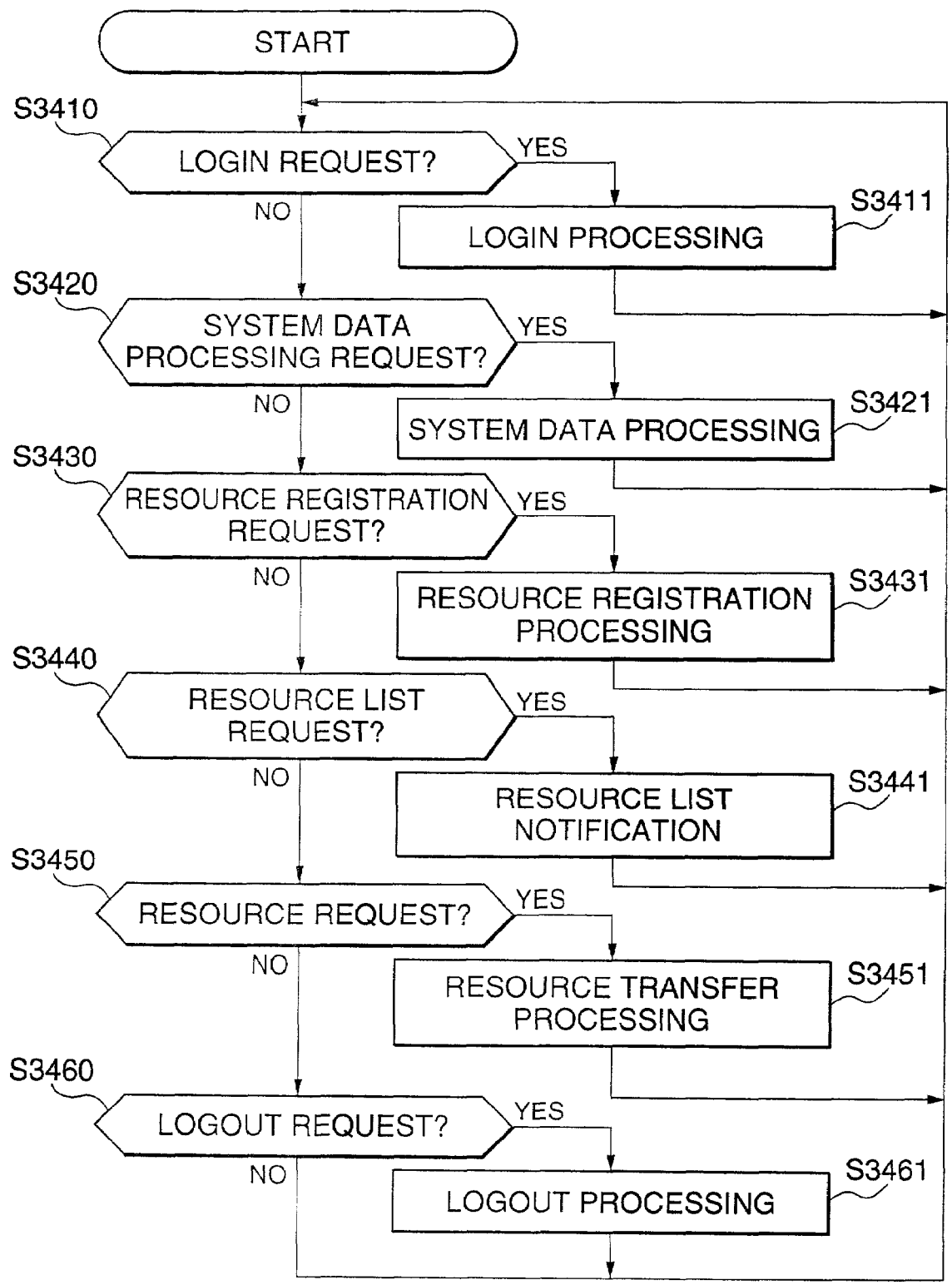
FIG. 17 is a flow chart showing object processing in the resource server.

FIG. 17 is a flow chart showing an example of object processing executed by the resource server 117 of the document delivery system. If, in step S3410, a login request is made, then in step S3411, login processing such as verification of the person requesting the access and session opening is performed. In step S3420, if a system data processing request is made, then, in step S3421, system data update processing and the like is performed in accordance with the request.

If a data registration request is made in step S3430, then, in step S3431, registration processing is performed on the transferred resource. If a resource list request is made in step S3440, then, in step S3441, a managed resource list is reported. If a resource request is made in step S3450, then, in step S3451, processing to transfer the requested resource is performed. In step S3460, if a logout request is made, then, in step S3461, logout processing such as session closing is performed.

Figure 18A:
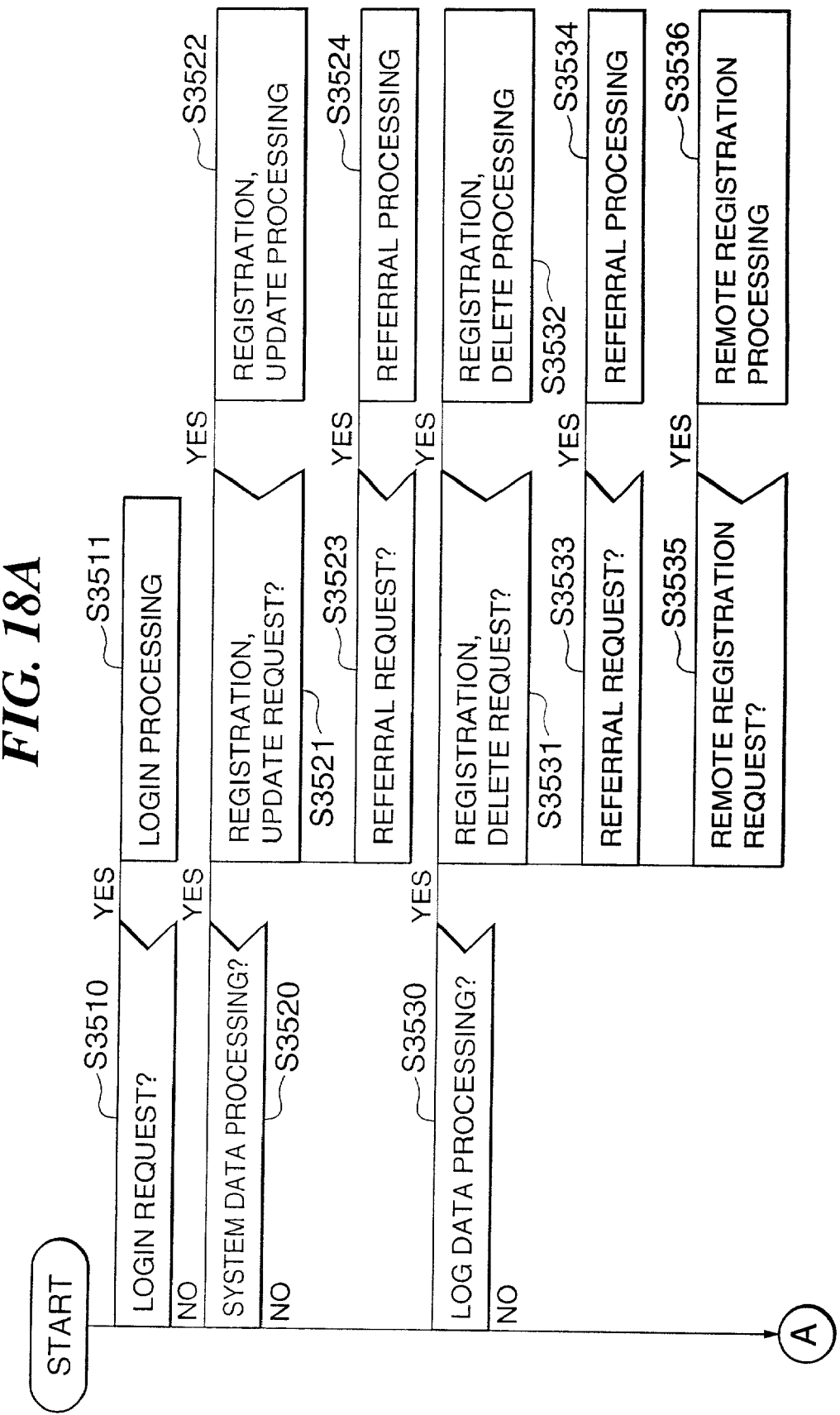
FIGS. 18A and 18B is a flow chart showing object processing in a device.
Figure 18B:
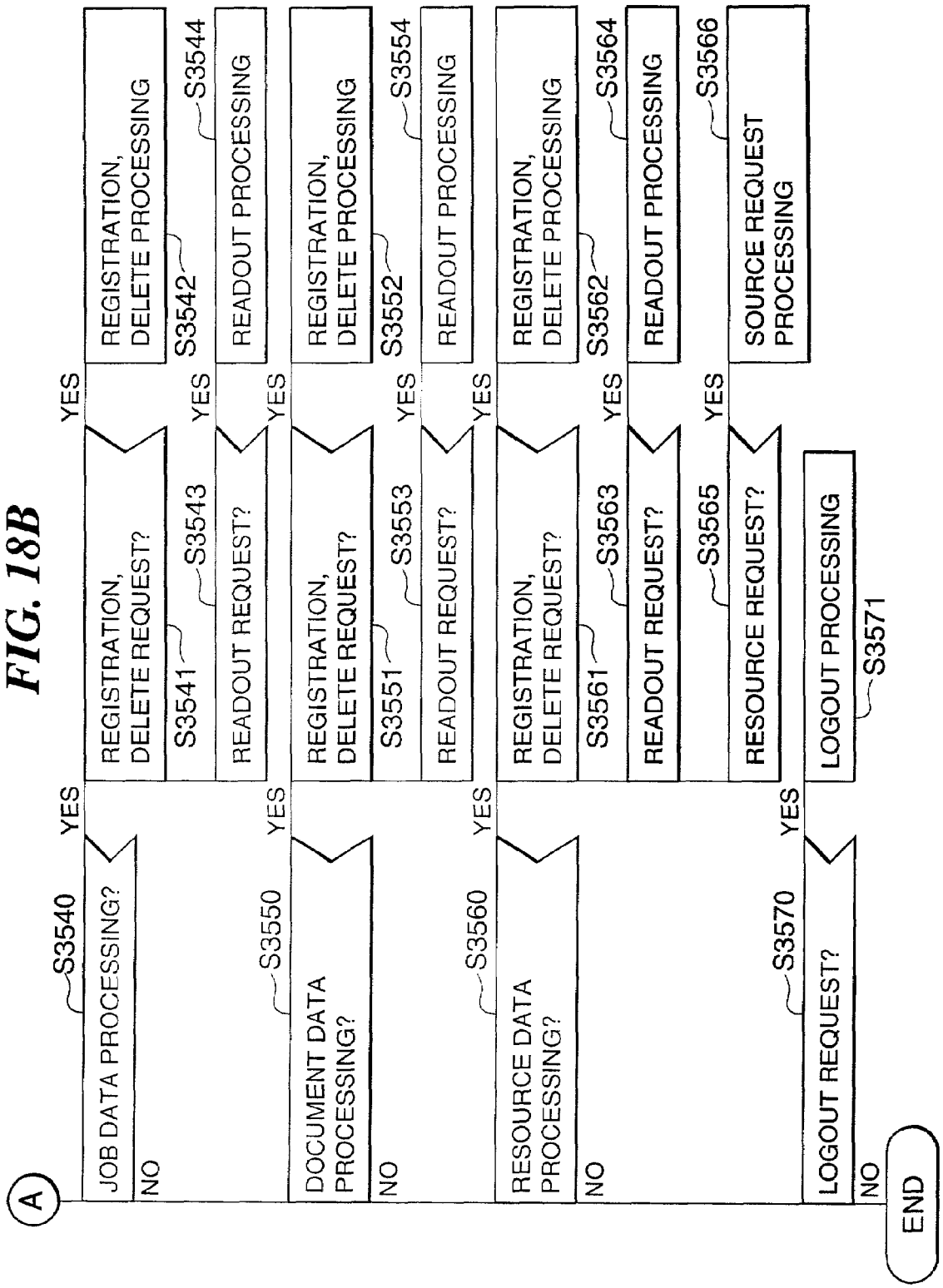

FIGS. 18A and 18B is a flow chart showing an example of object processing executed by the devices 121 and 122 of the document delivery system. If, in step S3510, a login request is made from the network side, then in step S3511, login processing such as verification of the person requesting the access, and session opening is performed. In step S3520, if a system data processing request is made, then, depending upon whether the request contents are requesting a registration or update (step S3521) or a referral (step S3523), either processing to register or update system data (step S3522) or referral processing to report the requested data (step S3524) is performed.

If a log data processing request is made in step S3530, then, depending upon whether the request contents are requesting a registration or deletion (step S3531), a referral (step S3533), or a remote registration (step S3535), either processing to register or delete log data (step S3532), referral processing (step S3534), or processing to perform remote registration to the specified log server (step S3535) is performed.

If a job data processing request is made in step S3540, then, depending upon whether the request contents are requesting a registration or deletion (step S3541) or a reading (step S3543), either processing to register or delete job data (step S3542) or read processing (step S3544) is performed.

If a document data processing request is made in step S3550, then, depending upon whether the request contents are requesting a registration or deletion (step S3551) or a reading (step S3553), either processing to register or delete document data (step S3552) or read processing (step S3554) is performed.

If a resource data processing request is made in step S3560, then, depending upon whether the request contents are requesting a registration or deletion (step S3561), a reading (step S3563), or resources (step S3565), either processing to register or delete resource data (step S3562), read processing (step S3564), or resource request processing to obtain a resource from an external resource server (step S3565) is performed.

In step S3570, if a logout request is made from the network side, then, in step S3571, logout processing such as session closing is performed.

Figure 19A:
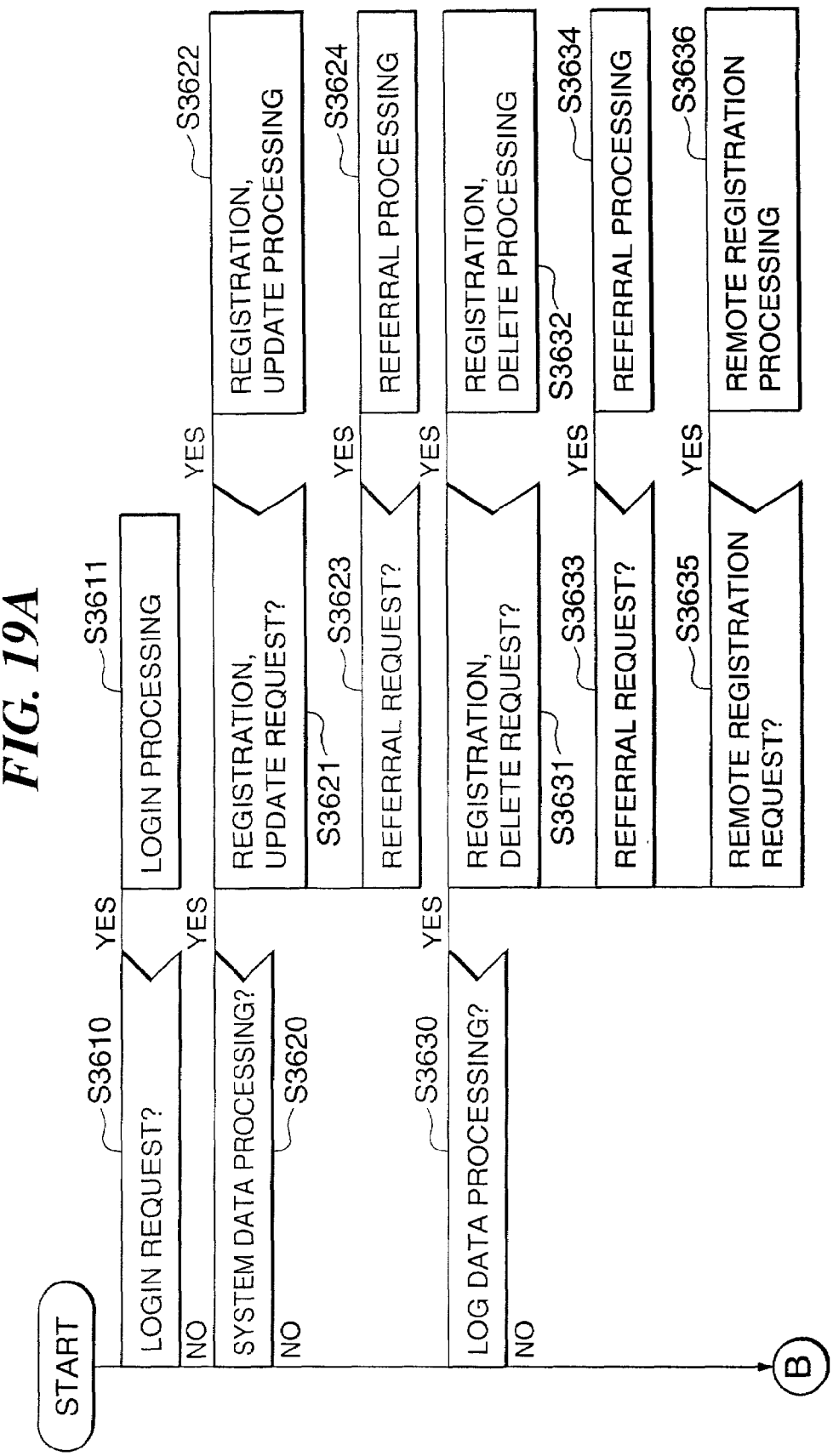
FIGS. 19A and 19B is a flow chart showing object processing in the delivery server.
Figure 19B:
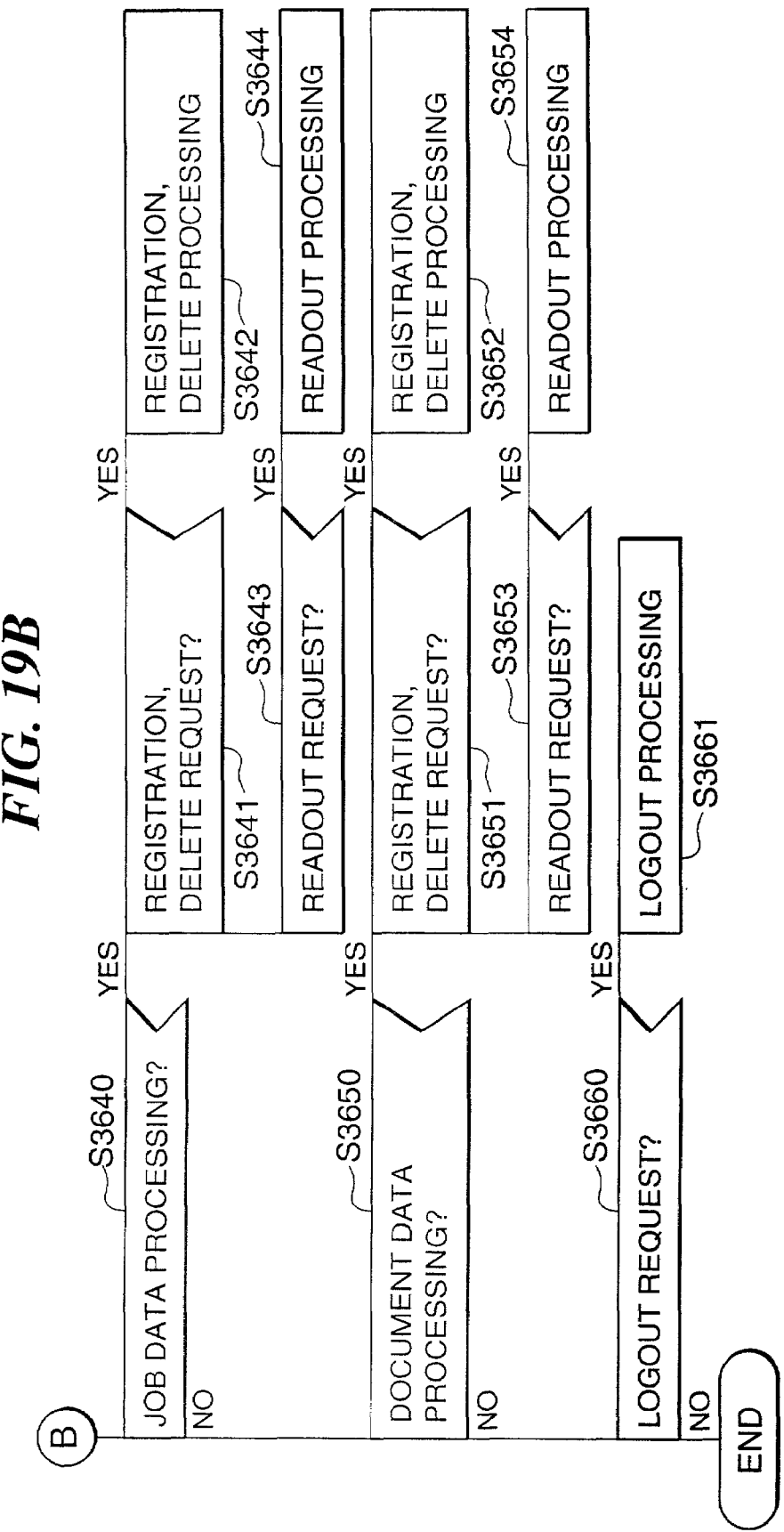

FIGS. 19A and 19B is a flow chart showing an example of object processing executed by the delivery server 115 of the document delivery system. If, in step S3610, a login request is made from the network side, then in step S3611, login processing such as verification of the person requesting the access, and session opening is performed.

In step S3620, if a system data processing request is made, then, depending upon whether the request contents are requesting a registration or update (step S3621) or a referral (step S3623), either processing to register or update system data (step S3622) or referral processing to report the requested data (step S3624) is performed.

If a log data processing request is made in step S3630, then, depending upon whether the request contents are requesting a registration or deletion (step S3631), a referral (step S3633), or a remote registration (step S3635), either processing to register or delete the log data (step S3632), referral processing (step S3634), or processing to perform remote registration to the specified log server (step S3635) is performed.

If a job data processing request is made in step S3640, then, depending upon whether the request contents are requesting a registration or deletion (step S3641) or a reading (step S3643), either processing to register or delete job data (step S3642) or read processing (step S3644) is performed.

If a document data processing request is made in step S3650, then, depending upon whether the request contents are requesting a registration or deletion (step S3651) or a reading (step S3653), either processing to register or delete document data (step S3652) or read processing (step S3654) is performed.

In step S3670, if a logout request is made from the network side, then, in step S3671, logout processing such as session closing is performed.

As has been described above, the flow of the processing in the delivery server 115 is basically the same as the flow of the processing in the devices 121 and 122.

Next, a detailed description will be given of the packaging method and the like in the delivery server 115 of the document delivery system.

FIG. 20 is a view useful in explaining an example of the flow of document data in the delivery server 115 of the document delivery system. Here, an example of the document delivery function using the delivery server 115 of the present embodiment will be described with reference to FIG. 20. Two lines for FAX communication (lines A1 and A2) are connected to the device A 121. In addition, one line for FAX communication (the line B) is connected to the device B 122. All of the users (131 to 134) are users of the mail server (server A) 114, while the users 3 and 4 133 and 134 are users of the document management server (server B) 113.

In a network environment such as this, functions such as the following can be provided through cooperation with the transfer job control section 1230, the object management section 1210, and the object database 1220. Namely:

a function of delivering scan documents and FAX reception documents from the devices 121 and 122 to predetermined users via the mail server;

a function of sharing document information among predetermined users by registering and managing scan documents and FAX reception documents from the devices 121 and 122 in the document management server; and a function of receiving document delivery instructions from each user (client) and performing management and execution of document delivery jobs that use predetermined devices.

FIG. 21 is a view useful in explaining an example of attribute values of objects associated with delivery settings in particular, in the delivery server 115 of the document delivery system. Basically, objects are created for each separate user, device, and line and various parameters that are necessary for the delivery processing are set as the attributes thereof using the manager tool, thus enabling the system to be operated.

It should be noted that, here, attributes relating to delivery settings for each object are collected and shown in a table format.

(1) Object ID: This is an internal management ID for identifying each object and the numbers thereof are issued and managed inside the server.

(2) Delivery settings: These are attribute values showing whether or not an object should undergo delivery processing.

(3) Delivery ID: This is set individually for each user. This ID is packaged, for example, such that it can operate by specifying using sub addresses that are based on FAX standard protocol from the FAX transmission destination, or specifying from the transmission side using a service (DDI) capable of setting a plurality of numbers for a single line. By specifying this ID, delivery processing corresponding to this ID is performed.

(4) Server used: Various servers (i.e. the mail server 114, the document management server 113, and the like) that are made use of during the delivery processing are registered here.

(5) Delivery destination specification: Specific delivery destinations (i.e. individual user folders, individual mail addresses, processing devices, and the like) are registered here.

FIGS. 22A and 22B is a view useful in explaining an example of attribute values relating, in particular, to device objects in the delivery server 115 of the document delivery system. Here, an example of attribute values relating to the functions of the devices 121 and 122 is given depicting two types of devices as samples, however, as the functions of various types of device are hereafter expanded, the types of attribute, parameter values, and the like may be added to or altered at any time.

Moreover, the setting operation for various attributes is basically performed for the respective devices 121 and 122 from the manager tool or directly from the operating section of the devices. In this delivery server, values that have already been set are, for example, obtained by the following means and then registered and managed.

Attributes are registered during the device registration from the manager tool.

Devices used only are registered from the manager tool. Enquires concerning detailed attribute information are made directly to the devices, or self registration can be performed by making a search for the necessary information via the directory service.

An outline of the types of basic attribute and the like will now be given.

(1) Object ID: This is an internal management ID for identifying each object and the numbers thereof are issued and managed inside the server.

(2) Basic device information: Information such as access addresses, device names and the like relating to the devices used are managed as attributes.

(3) Connection protocol: Protocol information used for each function can be managed as attributes in order to deal with cases in which the access protocol is different for each function at the time a device is used.

(4) Basic functions: Attributes are managed for specific support functions relating to print functions, FAX functions, scanner functions and the like supported by each device.

(5) Additional functions: These functions are managed as attributes so that whether or not additional functions handled at the device side are used can be known, for example, a log automatic remote registration function for a log server and a function of registering users using the delivery server as delivery address destinations and managing these as scan image transfer addresses.

FIG. 23 is a view useful in explaining an example of attribute values related, in particular, to delivery job objects in the delivery server 115 of the document delivery system. It is possible to execute the delivery processing in this system by managing and using data having attribute values such as those shown here as job objects for delivery processing.

(1) Job object ID: A job identifying ID with an identification number thereof generated within the system when a job is created.

(2) Job type: This shows the type of the document data delivery processing and identifies the type of delivery processing such as whether the document data should be registered in the document management server, whether the document data should undergo transmission processing as an attachment to an email, or whether a device should be made to perform FAX transmission processing or issue print instructions.

(3) Status: This is a field for registering status information for managing the status of the delivery processing.

(4) Transfer source: This is a data field for registering what the source of the delivery processing request is and may be a device, a user client, or the like.

(5) Transfer destination: This is a data field for registering the information on the actual delivery destination to which a document will be transferred and a processing device may be specified, a delivery destination mail address may be specified, a document registration folder in the document management server may be specified, etc.

(6) Document ID: This is an ID showing the document data (i.e. object) to be delivered.

(7) Data type: This shows the format of the document data and format conversion may be performed when necessary as a preliminary processing to the delivery processing in cases such as when the data format is one that is not handled at the delivery destination.

Figure 24A:
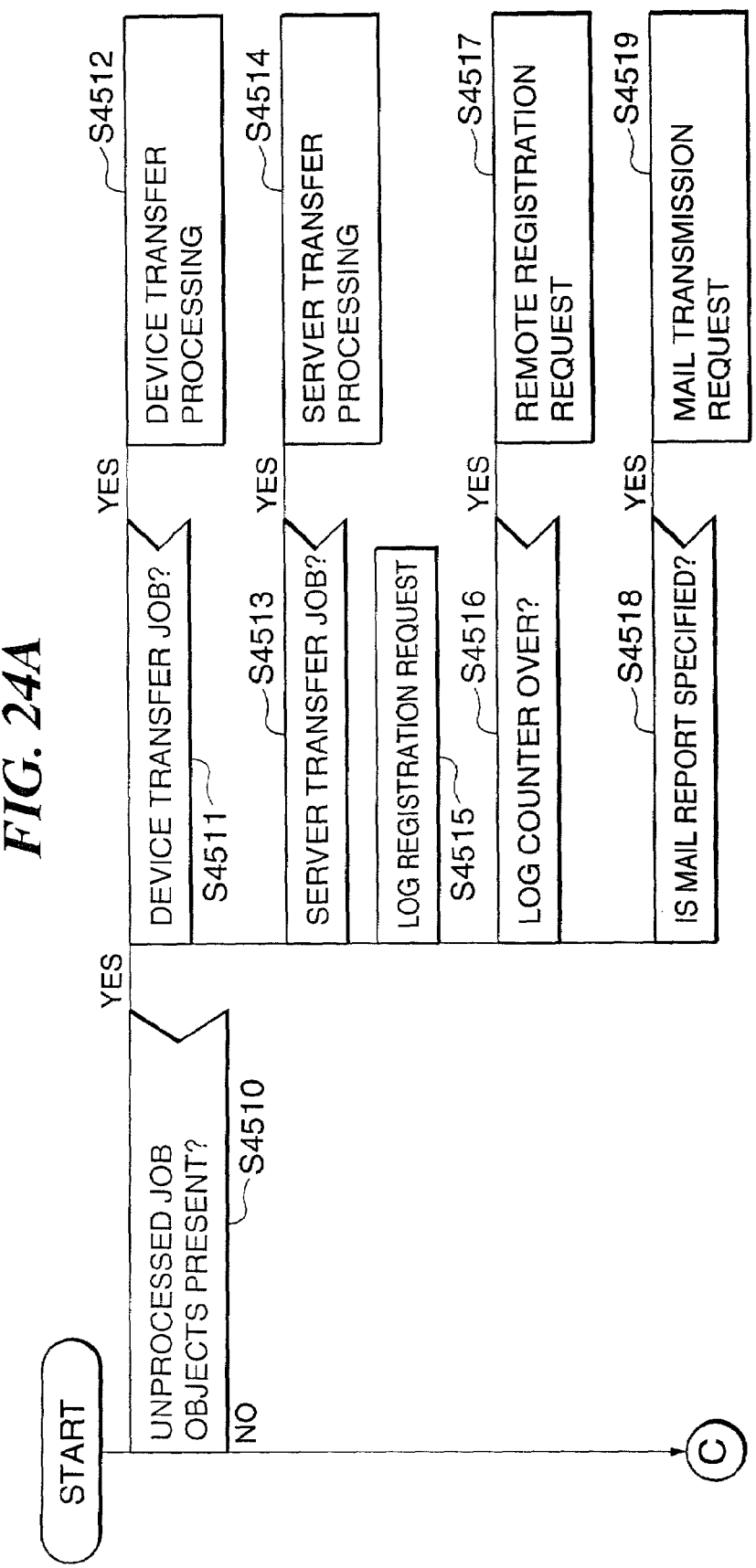
FIGS. 24A and 24B is a flow chart showing document transfer processing in the delivery server.
Figure 24B:
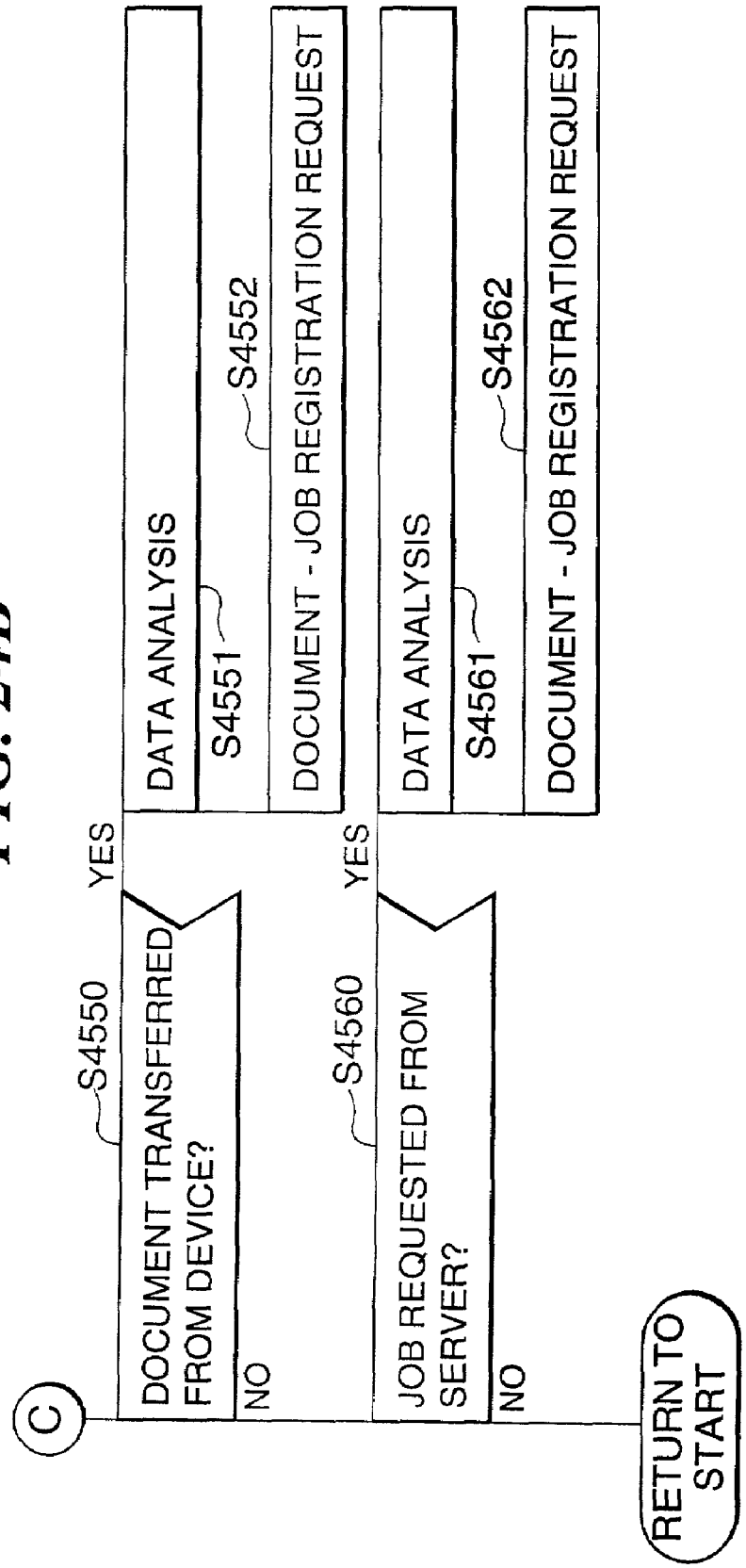

FIGS. 24A and 24B is a flow chart showing an example of document transmission processing executed by the delivery server 115 of the document delivery system. Here, an example of the processing flow, in particular, relating to document transfer (delivery) by the transfer job control section 1230 of the delivery server 115 is given. In step S4510, unprocessed job objects are detected and the following processing is then performed.

In step 4511, if a transfer job to a device is detected, then in step S4512, job transfer processing to a predetermined device is performed. In step S4513, if a job to transfer a document via a server is detected, then in step S4514, document transfer processing to the server is performed in accordance with the settings. At this time, if the processing is registration processing in the document management server 113, then information acquired from the device and relating to the document, for example, the creator of the document (e.g. information on the transmitter if the document has been received by FAX), the time the document was created (e.g. the time the document was received if the document was received by FAX), the number of pages in the document, and the like can be added as index information in the document registration and the registration processing then performed. At this time, if the format of the document is one that is not handled by the server at the transfer destination, then before the transfer processing is performed, the document is converted into a format that is handled by the server at the transfer destination.

In step S4515, a log relating to the transfer processing carried out is registered in the object database 1220 via the internal object management section 1210. The processing in step S4516 is performed in cases when the number of log registrations exceeds a predetermined number when the setting for remote registration to the predetermined log server 116 is defined as an attribute of the log object. At this time, in step S4517, the remote registration processing is performed.

In step S4518, it is determined whether the setting specifies reporting the result of the transfer processing by email. If the reporting is specified, in step S4519 processing for a mail transmission request via the mail server 114 is performed. The reason for this is to enable the fact that a new document has been registered to be reported to users who uses the folder in which that document is registered in particular when a document is registered automatically in the document management server 113. This processing can be easily performed by defining as attributes in the job object (1) whether or not to report by email after the transfer processing and (2) the email addresses to which the email report is to be sent, and by setting predetermined data in the job object at the time the job is created.

In step S4550, it is determined whether a document has been received in the device connector section 1240 from a device. If a document has been received, in step S4551, data such as information from the device relating to the handling of that document and the like is analyzed, and data for the transfer job is created based on delivery rules set in the system. In step S4552, document registration processing and job registration processing are performed.

In step S4560, it is determined whether a document has been received in the server connector section 1250 from a server. If a document has been received, in step S4561, data such as information from the server relating to the handling of that document and the like is analyzed, and data for the transfer job is created based on delivery rules set in the system. In step S4562, document registration processing and job registration processing are performed.

It should be noted that the way in which the basic document delivery processing flow such as that described here is put together is the same also in the job control section 1121 in the devices 121 and 122.

As has been described above, according to the document delivery system according to the present embodiment, the delivery server 115 performs the delivery settings for document information created by the devices 121 and 122. In addition, based on the delivery settings, processing to register document information in folders in the document management server 113, processing to attach document information transmitted via the mail server 114 to email addresses, and output processing of document delivery jobs for the devices 121 and 122 is also performed. Moreover, the additional information acquired from the devices 121 and 122 is registered as index information during the registration of the document information in the document management server 113 and control is performed such that a report of the fact that the document information has been registered is made during the registration of document information in the document management server 113 by email using the mail server 114 to mail addresses set in advance. As a result, the following effects are achieved.

Namely, by providing the delivery server 115 having the functions and means described below on a network, it is possible to construct a document delivery system in a form that is able to cooperate with server software used in basic business operations.

The document management server 113 having a document management function, the mail server 114 having an email delivery function, and access means (i.e. the delivery server 115) for accessing the devices 121 and 122 that execute various types of job are provided, and the performing of various types of delivery setting for document information (e.g. FAX reception information and scan information) created by the devices is made possible. In accordance with these delivery settings, it has also been made possible, for example, for processing to be performed to register document data from the devices 121 and 122 in predetermined folders in the document management server 113, and for processing to be performed to attach documents to predetermined email addresses, and for output processing to predetermined devices to be performed.

Document retrieval and the like has been simplified by providing means (the delivery server 115) for performing processing to automatically register information acquired as additional information (for example, the reception times for received FAX documents, transmission source information, transmission destination information, and the like) from the devices 121 and 122 as index information during the registration of a document in the document management server 113.

An improvement has been obtained in the usability, i.e. ease of use by a user who uses the document management server 113 by providing means (the delivery server 115) for automatically reporting by email to predetermined email addresses the fact that a document has been registered when a document is registered in the document management server 113.

Accordingly, according to the document delivery system, the following effects are achieved.

(1) Automatic delivery processing can be performed for document information (e.g. received FAX documents and scanned documents) created by a device, such as processing to register a document in a predetermined folder of the document management server, processing to attach documents to predetermined email addresses, and processing to output documents to predetermined devices.

(2) It is possible to easily perform document retrieval and the like because, when a document is registered in the document management server, processing is performed to automatically register data acquired from a device as additional data (for example, the reception times for received FAX documents, transmission source information, and the like) as index information.

(3) It is possible to obtain an improvement in the ease of use by a user using the document management server by automatically reporting by email to predetermined email addresses the fact that a document has been registered when a document is registered in the document management server.

As a result of the above, it is possible to improve the operating efficiency of the task of delivering documents in a network system.

OTHER EMBODIMENTS

In the above described embodiment, an example was given of devices having a printing function, an image reading function, and a FAX transmission-reception function, however, it is also possible for the present invention to be applied to a device having a printing function (e.g. a printer, a copier, and a facsimile apparatus), a device having an image reading function (e.g. a scanner, a copier, and a facsimile apparatus), a device having FAX transmission and reception functions (e.g. a facsimile apparatus), and a device having an optional plurality of functions from among the printing function, image reading function, and FAX transmission and reception functions (e.g. a copier, and MFP).

It should be noted that the present invention may be applied to a system formed of a plurality of apparatuses or to an apparatus formed of a single piece of equipment.

It is to be understood that the object of the present invention may also be accomplished by using a program as software which realizes the functions of any of the above described embodiments.

Further, it is to be understood that the present invention may be implemented by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code read out from the storage medium realizes the functions of any of the above described embodiments, so that the storage medium storing the program code also constitutes the present invention.

The storage medium for supplying the program code may be, for example, a floppy (Registered Trademark) disk, a hard disk, an optical disk, a magneto-optical disk, a CD-ROM, a CD-R, a magnetic tape, a non-volatile memory card, or a ROM. The program code may be supplied by downloading from a server computer through a communication network.

Further, it is to be understood that the functions of any of the above described embodiments may be accomplished not only by executing a program code read out by a computer, but also by causing an OS (Operating System) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU, etc. provided in the expansion board or the expansion unit to perform a part or all of the actual operations based on instructions of the program code.

Figure 26:
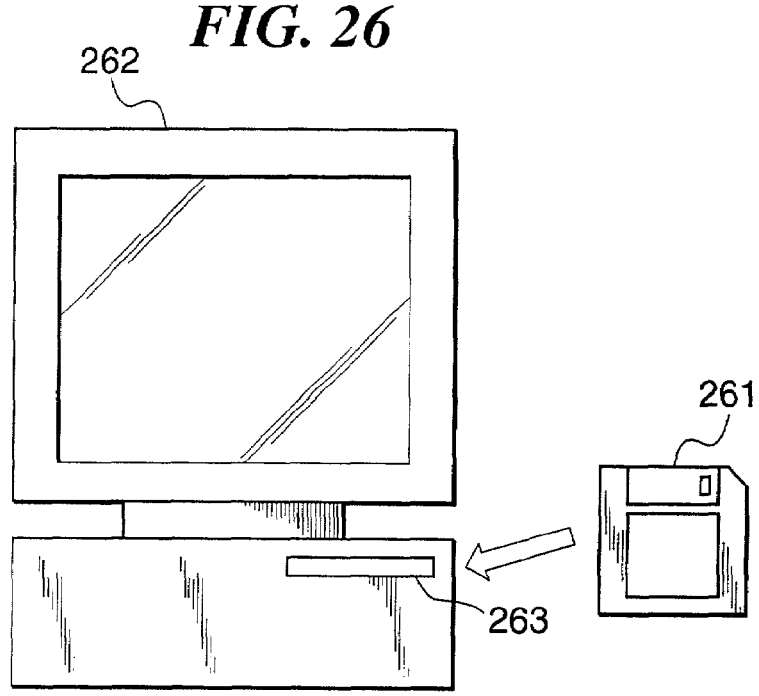

FIG. 26 is a view useful in explaining an example of the concept of supplying the program and related data for executing the document delivery method of the present invention from the storage medium to a device such as a computer. This program and related data are supplied by inserting a storage medium 261 such as a floppy disk, or CD-ROM in an insertion port 263 of the storage medium drive that is installed in a device 262 such as a computer. Thereafter, the program and related data can be executed by either installing the program and related data from the storage medium 261 temporarily onto the hard disk and then loading them from the hard disk onto the RAM, or by loading the program and related data directly onto the RAM without installing them first onto the hard disk.

In this case, in the document delivery system, when the program is executed, the program can be executed by, for example, supplying the program and related data to apparatuses forming the document delivery system via an apparatus such as the computer described with reference to FIG. 26, or by storing the program and related data in advance in the apparatuses forming the document delivery system.

Figure 25:
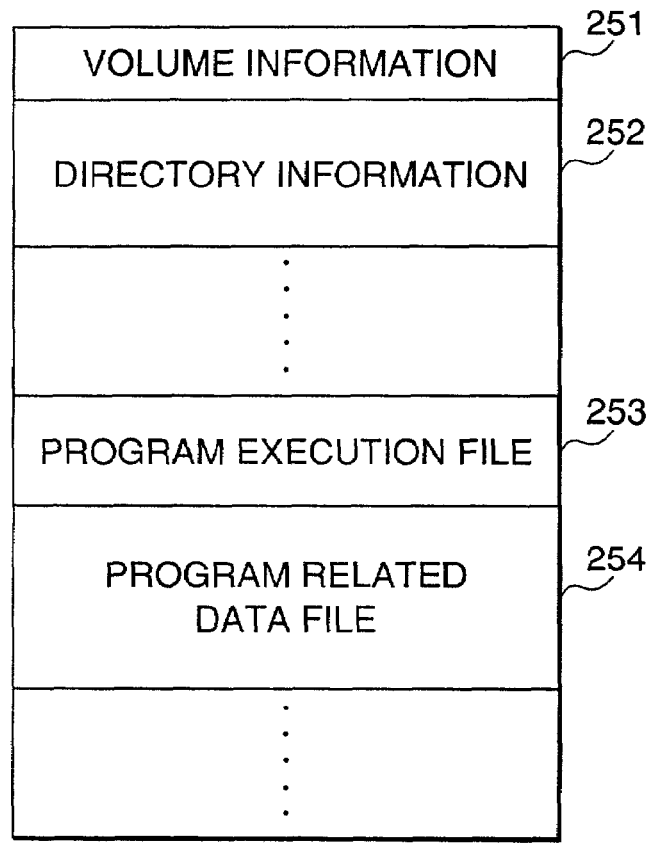
FIG. 25 is a view showing the structure of the stored contents of a storage medium in which is stored a program for executing the document delivery method of the present invention and related data.

FIG. 25 is a view useful in explaining an example of the structure of the contents stored in the storage medium storing the program and related data. The storage medium is comprised of storage contents such as, for example, volume information 251, directory information 252, program execution files 253, and program related data files 254. The program is encoded based on the flow charts described above.

What is claimed is:

1. A document delivery apparatus connected via a network to a plurality of external devices and a plurality of servers, comprising:
    receiving means for receiving a document from one of the external devices, which is a transmission source of the document;
    delivery setting means for making delivery settings using a managing tool, wherein the delivery settings store a relationship between the external devices and delivery destinations; and
    delivery means for determining a delivery destination of the document based on the delivery settings and the one external device which is the transmission source of the document, and for delivering the document to the determined delivery destination,
    wherein the delivery destination includes at least one of the servers or an external device that processes the delivered document.

2. A document delivery apparatus according to claim 1, wherein the delivery destinations include a document management server that manages documents and a mail server that delivers electronic mails.

3. A document delivery apparatus according to claim 1, wherein the at least one server comprises a document management server that manages documents, and said delivery means comprises control means for delivering additional information acquired from the external device together with the document to said document management server as index information, and registering the document and the index information in said document management server.

4. A document delivery apparatus according to claim 3, wherein the received document is a fax document received from a fax device, and the additional information comprises at least one of information of a transmitter of the received fax document, reception time information relating to the received fax document, or document page number information.

5. A document delivery apparatus according to claim 1, wherein the at least one server comprises a document management server that manages documents, and wherein the document delivery apparatus further comprises control means operable when the received document is delivered to the document management server, for notifying by electronic mail to at least one predetermined electronic mail address that the document has been registered.

6. A document delivery apparatus according to claim 1, wherein the delivery settings are set for each of the plurality of external devices that is a transmission source of the document.

7. A document delivery apparatus according to claim 1, wherein the delivery settings are made in accordance with instructions from any of said external devices.

8. A document delivery apparatus according to claim 1, wherein the received document includes a fax document or a scan document.

9. A document delivery apparatus according to claim 1, wherein, when the document is in a format different from one handled by the delivery destination, said delivery means converts the format of the received document to the one handled by the delivery destination and then delivers the converted document to the delivery destination.

10. A document delivery apparatus according to claim 1, wherein the external devices each have at least one function of an image reading function or a facsimile function.

11. A document delivery method for controlling a delivery device connected via a network to a plurality of external devices and a plurality of servers, comprising:
    a delivery setting step of making delivery settings using a managing tool, wherein the delivery settings store a relationship between the external devices and delivery destinations;
    a receiving step of receiving a document from one of the external devices, which is a transmission source of the document; and
    a delivery step of determining a delivery destination of the document based on the delivery settings and the one external device which is the transmission source of the document, and delivering the document to the determined delivery destination,
    wherein the delivery destination includes at least one of the servers or an external device that processes the delivered document.

12. A document delivery method according to claim 11, wherein the delivery destinations include a document management server that manages documents and a mail server that delivers electronic mails.

13. A document delivery method according to claim 11, wherein the at least one server comprises a document management server that manages documents, and said delivery step comprises a control step of delivering additional information acquired from the external device together with the document to said document management server as index information, and registering the document and the index information in said document management server.

14. A document delivery method according to claim 13, wherein the received document is a fax document received from a fax device, and the additional information comprises at least one of information of a transmitter of the received fax document, reception time information relating to the received fax document, or document page number information.

15. A document delivery method according to claim 11, wherein the at least one server comprises a document management server that manages documents, and wherein the document delivery method further comprises a control step of notifying by electronic mail to at least one predetermined electronic mail address that the document has been registered, when the received document is delivered to the document management server.

16. A document delivery method according to claim 11, wherein the delivery settings are set for each of the plurality of external devices that is a transmission source of the document.

17. A document delivery method according to claim 11, wherein the delivery settings such that the delivery settings are made in accordance with instructions from any of said external devices.

18. A document delivery method according to claim 11, wherein the received document includes a fax document or a scan document.

19. A document delivery method according to claim 11, wherein, when the document is in a format different from one handled by the delivery destination, in said delivery step the format of the received document is converted to the one handled by the delivery destination and then the converted document is delivered to the delivery destination.

20. A document delivery method according to claim 11, wherein the external devices each have at least one function of an image reading function or a facsimile function.

21. A computer-readable medium storing a document delivery computer program for controlling a document delivery apparatus connected via a network to a plurality of external devices and a plurality of servers, the computer program comprising:
- a delivery setting instruction for making delivery settings using a managing tool, wherein the delivery settings store a relationship between the external devices and delivery destinations;
- a receiving instruction for receiving a document from one of the external devices, which is a transmission source of the document; and
- a delivery instruction for determining a delivery destination of the document based on the delivery settings and the one external device which is the transmission source of the document, and delivering the document to the determined delivery destination,
- wherein the delivery destination includes at least one of the servers or an external device that processes the delivered document.

22. A computer-readable medium storing a document delivery computer program according to claim 21, wherein the delivery destinations include a document management server that manages documents and a mail server that delivers electronic mails.

23. A computer-readable medium storing a document delivery computer program according to claim 21, wherein the at least one server comprises a document management server that manages documents, and said delivery instruction comprises a control instruction for delivering additional information acquired from the external device together with the document to said document management server as index information, and registering the document and the index information in said document management server.

24. A computer-readable medium storing a document delivery computer program according to claim 23, wherein the received document is a fax document received from a fax device, and the additional information comprises at least one of information of a transmitter of the received fax document, reception time information relating to the received fax document, or document page number information.

25. A computer-readable medium storing a document delivery computer program according to claim 21, wherein the delivery destination for the received document comprises a document management server that manages documents, and further including a control instruction for notifying by electronic mail to at least one predetermined electronic mail address that the document has been registered, when the received document is delivered to the document management server.

26. A computer-readable medium storing a document delivery computer program according to claim 21, wherein the delivery settings are set for each of the plurality of external devices that is a transmission source of the document.

27. A computer-readable medium storing a document delivery computer program according to claim 21, wherein the delivery settings are made in accordance with instructions from any of said external devices.

28. A computer-readable medium storing a document delivery computer program according to 21, wherein the received document includes a fax document or a scan document.

29. A computer-readable medium storing a document delivery computer program according to claim 21, wherein, when the document is in a format different from one handled by the delivery destination, in said delivery instruction the format of the received document is converted to the one handled by the delivery destination and then the document is delivered to the delivery destination.

30. A computer-readable medium storing a document delivery computer program according to claim 21, wherein the external devices each have at least one function of an image reading function or a facsimile function.

31. A computer-readable storage medium storing a document delivery computer program for controlling a document delivery apparatus connected via a network to a plurality of external devices and a plurality of servers, the computer program comprising:
- a delivery setting step of making delivery settings using a managing tool, wherein the delivery settings store a relationship between the external devices and delivery destinations;
- a receiving step of receiving a document from one of the external devices, which is a transmission source of the document; and
- a delivery step of determining a delivery destination of the document based on the delivery settings and the one external device which is the transmission source of the document, and delivering the document to the determined delivery destination,
- wherein the delivery destination includes at least one of the servers or an external device that processes the delivered document.

32. A document delivery system comprising:
- a network;
- a plurality of external devices;
- a plurality of servers; and
- a document delivery apparatus connected via said network to said plurality of external devices and said plurality of servers, said document delivery apparatus comprising:
- receiving means for receiving a document from one of said external devices, which is a transmission source of the document;
- delivery setting means for making delivery settings using a manager tool, wherein the delivery settings store a relationship between the external devices and delivery destinations; and
- delivery means for determining a delivery destination of the document based on the delivery settings and the one external device which is the transmission source of the document, and for delivering the document to the determined delivery destination,
- wherein the delivery destination includes at least one of the servers or an external device that processes the delivered document.

* * * * *